United States Patent
Crandall et al.

(10) Patent No.: US 12,165,457 B1
(45) Date of Patent: *Dec. 10, 2024

(54) SYSTEMS AND METHODS FOR CASH-TILL OPTIMIZATION

(71) Applicant: G4S Retail Solutions (USA) Inc., Jupiter, FL (US)

(72) Inventors: Shellie Crandall, Palm Beach Gardens, FL (US); Brian McCabe, Jupiter, FL (US); William Conner Barry, Oakhill, FL (US)

(73) Assignee: G4S Retail Solutions (USA) Inc., Jupiter, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/315,883

(22) Filed: May 11, 2023

Related U.S. Application Data

(63) Continuation of application No. 17/696,318, filed on Mar. 16, 2022, now Pat. No. 11,688,221, which is a continuation of application No. 16/697,503, filed on Nov. 27, 2019, now Pat. No. 11,315,379.

(60) Provisional application No. 62/845,651, filed on May 9, 2019, provisional application No. 62/773,550, filed on Nov. 30, 2018.

(51) Int. Cl.
| | | |
|---|---|---|
| G07F 19/00 | (2006.01) | |
| G07D 11/23 | (2019.01) | |
| G07D 11/24 | (2019.01) | |
| G07D 11/30 | (2019.01) | |
| G07D 11/34 | (2019.01) | |

(52) U.S. Cl.
CPC .............. *G07D 11/24* (2019.01); *G07D 11/23* (2019.01); *G07D 11/30* (2019.01); *G07D 11/34* (2019.01)

(58) Field of Classification Search
CPC ...... G06Q 10/087; G16H 20/13; G16H 40/20; G06F 17/0092
USPC ................ 235/383, 385, 462.01, 462.09
See application file for complete search history.

(56) References Cited

U.S. PATENT DOCUMENTS

| | | |
|---|---|---|
| 5,553,320 A | 9/1996 | Matsuura et al. |
| 7,610,215 B1 | 10/2009 | Folk et al. |
| (Continued) | | |

OTHER PUBLICATIONS

Unpublished U.S. Appl. No. 12/241,397, United States Patent and Trademark Office, US.

(Continued)

*Primary Examiner* — Daniel St Cyr
(74) *Attorney, Agent, or Firm* — ALSTON & BIRD LLP

(57) ABSTRACT

The operation of one or more cash handling devices may be remotely modified by updating locally stored cash dispensing data at each of the one or more cash handling devices based at least in part on optimization data generated at a monitoring server. Operational data is received from the one or more cash handling devices and utilized to generate historical data within a historical database. Optimization parameters are received for each of one or more cash handling devices, and the optimization parameters are utilized together with the generated historical data to generate optimization data utilizing one or more optimization models. The optimization data is transmitted to applicable cash handling devices to cause the cash handling device to update locally stored executing instructions causing operation of the cash handling device to dispense cash into one or more register tills.

20 Claims, 11 Drawing Sheets

(56) References Cited

U.S. PATENT DOCUMENTS

| | | | |
|---|---|---|---|
| 7,635,085 B2 | 12/2009 | Brown et al. |
| 7,900,829 B1 | 3/2011 | Folk et al. |
| 7,940,176 B2 | 5/2011 | Bohen et al. |
| 7,950,512 B2 | 5/2011 | Folk et al. |
| 7,954,699 B1 | 6/2011 | Sanders et al. |
| 8,011,581 B1 | 9/2011 | Folk et al. |
| 8,019,663 B1 | 9/2011 | Bohen et al. |
| 8,025,214 B1 | 9/2011 | Folk et al. |
| 8,032,415 B2 | 10/2011 | Sanders et al. |
| 8,047,427 B2 | 11/2011 | Sanders et al. |
| 8,056,305 B1 | 11/2011 | Folk et al. |
| 8,096,398 B2 | 1/2012 | Folk et al. |
| 8,117,127 B1 | 2/2012 | Sanders et al. |
| 8,141,772 B1 | 3/2012 | Folk et al. |
| 8,157,078 B1 | 4/2012 | Folk et al. |
| 8,172,067 B1 | 5/2012 | Folk et al. |
| 8,175,970 B1 | 5/2012 | Mon et al. |
| 8,177,132 B1 | 5/2012 | Bohen et al. |
| 8,181,854 B1 | 5/2012 | Folk et al. |
| 8,181,856 B1 | 5/2012 | Folk et al. |
| 8,196,826 B2 | 6/2012 | Folk et al. |
| 8,201,680 B1 | 6/2012 | Folk et al. |
| 8,210,429 B1 | 7/2012 | Bohen et al. |
| 8,214,257 B1 | 7/2012 | Folk et al. |
| 8,225,988 B1 | 7/2012 | Bohen et al. |
| 8,227,936 B1 | 7/2012 | Folk et al. |
| 8,260,669 B1 | 9/2012 | Folk et al. |
| 8,272,563 B1 | 9/2012 | Folk et al. |
| 8,274,364 B1 | 9/2012 | Bohen et al. |
| 8,327,995 B1 | 12/2012 | Folk et al. |
| 8,346,640 B1 | 1/2013 | Sanders et al. |
| 8,387,874 B1 | 3/2013 | Bohen et al. |
| 8,396,278 B2 | 3/2013 | Jones et al. |
| 8,401,965 B2 | 3/2013 | Johnson et al. |
| 8,407,119 B2 | 3/2013 | Folk et al. |
| 8,430,303 B1 | 4/2013 | Sanders et al. |
| 8,517,257 B1 | 8/2013 | Folk et al. |
| 8,556,166 B1 | 10/2013 | Folk et al. |
| 8,561,885 B1 | 10/2013 | Folk et al. |
| 8,571,948 B1 | 10/2013 | Nichols et al. |
| 8,600,842 B1 | 12/2013 | Sanders et al. |
| 8,601,771 B2 | 12/2013 | Folk et al. |
| 8,602,295 B1 | 12/2013 | Sanders et al. |
| 8,640,945 B1 | 2/2014 | McCormick |
| 8,781,903 B1 | 7/2014 | Bohen et al. |
| 8,812,366 B2 | 8/2014 | Folk et al. |
| 8,812,394 B1 | 8/2014 | Folk et al. |
| 8,909,547 B2 | 12/2014 | Bohen et al. |
| 8,925,797 B1 | 1/2015 | Bohen et al. |
| 9,004,352 B1* | 4/2015 | Graef .................. G07F 19/202 |
| | | | 235/491 |
| 9,064,366 B1 | 6/2015 | Folk et al. |
| 9,070,125 B1 | 6/2015 | Folk et al. |
| 9,098,960 B1 | 8/2015 | Folk et al. |
| 9,311,671 B2 | 4/2016 | Folk et al. |
| 9,547,848 B2 | 1/2017 | Folk et al. |
| 9,697,493 B2 | 7/2017 | Folk et al. |
| 9,715,793 B1 | 7/2017 | Brancaccio |
| 10,977,889 B1 | 4/2021 | McCabe et al. |
| 11,188,910 B2 | 11/2021 | Yang |
| 11,315,379 B1* | 4/2022 | Crandall .............. G07G 1/0009 |
| 11,410,149 B1 | 8/2022 | Goetz |
| 11,688,221 B1* | 6/2023 | Crandall .............. G07F 19/209 |
| | | | 235/379 |
| 2002/0074709 A1 | 6/2002 | Kanagawa |
| 2005/0011721 A1 | 1/2005 | Armanini et al. |
| 2005/0027626 A1 | 2/2005 | Garcia |
| 2005/0289030 A1 | 12/2005 | Smith |
| 2006/0253349 A1 | 11/2006 | Brooks, Jr. et al. |
| 2009/0070263 A1 | 3/2009 | Davis et al. |
| 2010/0131407 A1 | 5/2010 | Folk et al. |
| 2011/0060639 A1 | 3/2011 | Garcia |
| 2011/0258090 A1 | 10/2011 | Bosch et al. |
| 2012/0073482 A1* | 3/2012 | Meeker .................. E05B 47/00 |
| | | | 109/23 |
| 2013/0191196 A1 | 7/2013 | Cecala |
| 2013/0232064 A1 | 9/2013 | Bosch |
| 2013/0346135 A1 | 12/2013 | Siemens et al. |
| 2014/0074708 A1 | 3/2014 | Bellamy |
| 2014/0279675 A1* | 9/2014 | Wiig .................... G06Q 10/067 |
| | | | 705/348 |
| 2014/0353375 A1 | 12/2014 | Turocy et al. |
| 2015/0199661 A1 | 7/2015 | Saoji et al. |
| 2017/0061561 A1 | 3/2017 | Cha |
| 2017/0193731 A1 | 7/2017 | Kim et al. |
| 2017/0232300 A1 | 8/2017 | Tran et al. |
| 2017/0286883 A1 | 10/2017 | Nail et al. |
| 2018/0005193 A1 | 1/2018 | Crandall et al. |
| 2018/0047239 A1 | 2/2018 | Niizuma |
| 2018/0078843 A1 | 3/2018 | Tran et al. |
| 2018/0144321 A1 | 5/2018 | Baar et al. |
| 2018/0181935 A1 | 6/2018 | Johnson |
| 2018/0218323 A1* | 8/2018 | Nguyen .................. G06Q 40/02 |
| 2018/0240190 A1 | 8/2018 | Schumacher |
| 2018/0293649 A1 | 10/2018 | Morgan et al. |
| 2018/0300703 A1 | 10/2018 | Hiramatsu et al. |
| 2019/0220839 A1 | 7/2019 | Oliynyk |
| 2021/0327198 A1 | 10/2021 | Yukawa |

OTHER PUBLICATIONS

NonFinal Office Action for U.S. Appl. No. 16/516,026, filed Jul. 9, 2020, (9 pages), United States Patent and Trademark Office, US.

NonFinal Office Action for U.S. Appl. No. 16/516,000, filed Aug. 13, 2020, (17 pages), United States Patent and Trademark Office, US.

NonFinal Office Action for U.S. Appl. No. 16/697,503, filed Sep. 29, 2020, (15 pages), United States Patent and Trademark Office, US.

NonFinal Office Action for U.S. Appl. No. 16/906,056, dated Oct. 6, 2021, (16 pages), United States Patent and Trademark Office, US.

Notice of Allowance and Fee(s) Due for U.S. Appl. No. 16/906,056, dated Apr. 27, 2022, (13 pages), United States Patent and Trademark Office, US.

NonFinal Office Action for U.S. Appl. No. 17/182,704, dated Jun. 17, 2022, (9 pages), United States Patent and Trademark Office, US.

NonFinal Office Action for U.S. Appl. No. 17/166,561, dated Oct. 14, 2022, (8 pages), United States Patent and Trademark Office, US.

Notice of Allowance for U.S. Appl. No. 16/928,460, dated Feb. 1, 2023, (11 pages), United States Patent and Trademark Office, US.

Notice of Allowance and Fee(s) Due for U.S. Appl. No. 17/696,318, dated Feb. 23, 2023, (9 pages), United States Patent and Trademark Office, US.

Non-Final Office Action for U.S. Appl. No. 17/166,561, dated Dec. 28, 2023, (17 pages), United States Patent and Trademark Office.

* cited by examiner

FIG. 9

| Department-Based Comfort Levels |||||||||
| Department | $0.01 | $0.05 | $0.10 | $0.25 | $1.00 | $5.00 | $20.00 | $100.00 |
| --- | --- | --- | --- | --- | --- | --- | --- | --- |
| FRONT END | 10 | 5 | 5 | 10 | 10 | 5 | 0 | 0 |
| PHARMACY | 10 | 5 | 5 | 10 | 10 | 5 | 0 | 0 |
| PAY STATION | 10 | 5 | 5 | 10 | 10 | 5 | 0 | 0 |
| OTHER | 10 | 5 | 5 | 10 | 10 | 5 | 0 | 0 |
| ELECTRONICS | 10 | 5 | 5 | 10 | 10 | 5 | 0 | 0 |
| GARDEN CENTER | 10 | 5 | 5 | 10 | 10 | 5 | 0 | 0 |
| SERVICE DESK | 10 | 5 | 5 | 10 | 10 | 5 | 0 | 0 |

FIG. 10

SYSTEMS AND METHODS FOR CASH-TILL OPTIMIZATION

CROSS-REFERENCE TO RELATED APPLICATIONS

This patent application is a continuation of U.S. patent application Ser. No. 17/696,318, filed Mar. 16, 2022, which is a continuation of U.S. patent application Ser. No. 16/697,503, filed Nov. 27, 2019 and now issued as U.S. Pat. No. 11,315,379, which claims priority from U.S. Provisional Patent Appl. Ser. No. 62/773,550, filed Nov. 30, 2018, and U.S. Provisional Patent Appl. Ser. No. 62/845,651, filed May 9, 2019, each of which are incorporated herein by reference in their entirety.

BACKGROUND

Brick-and-Mortar commercial establishments, such as retail stores that accept cash payments for goods and services must periodically replenish and/or retrieve cash from one or more register tills each associated with corresponding point-of-sale (POS) systems/terminals to ensure that sufficient cash of certain denominations are available to provide change to customers, and to ensure that the register does not overfill with cash. However, particularly for large retail establishments having a large number of register tills in use, these retail establishments have historically been unable to accurately monitor cash usage from each individual register till so as to optimize the amount of cash within a register till.

Through applied effort and ingenuity, various technical problems associated with historical cash till filling have been solved through embodiments as discussed herein.

BRIEF SUMMARY

Various embodiments are directed to systems and methods for providing data to one or more cash handling devices to optimize the amount of cash dispensed into specific register tills so as to provide till-specific cash fill amounts for specific register tills. Various embodiments receive cash usage data generated specifically for defined register tills, and optimize dispensing data based at least in part on the defined register tills and one or more optimization parameters identified for one or more register tills.

Certain embodiments are directed to an automated system for updating locally stored cash dispensing data at a cash handling device, the system comprising one or more memory storage areas and one or more processors collectively configured to: receive, via a communication interface, operational data from one or more cash handling devices, wherein the operational data received from each of the one or more cash handling devices comprises one or more of: (a) a cash handling device identifier, (b) cash handling device configuration data, (c) one or more register till identifiers, or (d) register till usage data associated with the one or more register till identifiers; generate, within the one or more memory storage areas, historical data based at least in part on the operational data received from one or more cash handling devices, wherein the historical data identifies till usage data associated with one or more register till identifiers over time; receive, via the one or more processors, optimization parameters applicable to one or more register tills; generate, via the one or more processors and based at least in part on the optimization parameters and the historical data, optimization data associated with one or more register till identifiers; and transmit at least a portion of the optimization data to a cash handling device associated with one or more register till identifiers, wherein the optimization data causes the cash handling device to update locally stored executing instructions to implement the optimization data during cash dispensing processes for one or more register tills.

In certain embodiments, receiving optimization parameters comprises receiving user input indicative of one or more optimization parameters applicable to one or more register tills. Moreover, receiving optimization parameters comprises receiving optimization parameters associated with one or more register till identifiers to optimize cash distributions generated in association with the one or more register till identifiers. In various embodiments, receiving optimization parameters associated with one or more register till identifiers comprises receiving optimization parameters associated with a register group identifier, and wherein the register group identifier is associated with a plurality of register till identifiers. In certain embodiments, generating optimization data associated with one or more register till identifiers comprises generating optimization data associated with at least one cash denomination and associated with at least one time period. In various embodiments, at least a portion of the optimization data is associated with a cash handling device identifier, and wherein the optimization data further causes the cash handling device to move cash stored within the cash handling device into a deposit cassette. Moreover, in certain embodiments, at least two of the optimization parameters are interrelated.

Various embodiments are directed to a method for updating locally stored cash dispensing data at a cash handling device, the method comprising: receiving, via a communication interface, operational data from one or more cash handling devices, wherein the operational data received from each of the one or more cash handling devices comprises one or more of: (a) a cash handling device identifier, (b) cash handling device configuration data, (c) one or more register till identifiers, or (d) register till usage data associated with the one or more register till identifiers; generating, within one or more memory storage areas, historical data based at least in part on the operational data received from one or more cash handling devices, wherein the historical data identifies till usage data associated with one or more register till identifiers over time; receiving, via the one or more processors, optimization parameters applicable to one or more register tills; generating, via the one or more processors and based at least in part on the optimization parameters and the historical data, optimization data associated with one or more register till identifiers; and transmitting at least a portion of the optimization data to a cash handling device associated with one or more register till identifiers, wherein the optimization data causes the cash handling device to update locally stored executing instructions to implement the optimization data during cash dispensing processes for one or more register tills.

In certain embodiments, receiving optimization parameters comprises receiving user input indicative of one or more optimization parameters applicable to one or more register tills. In various embodiments, receiving optimization parameters comprises receiving optimization parameters associated with one or more register till identifiers to optimize cash distributions generated in association with the one or more register till identifiers. In certain embodiments, receiving optimization parameters associated with one or more register till identifiers comprises receiving optimization parameters associated with a register group identifier, and wherein the register group identifier is associated with a plurality of register till identifiers. Moreover, in various embodiments, generating optimization data associated with one or more register till identifiers comprises generating optimization data associated with at least one cash denomination and associated with at least one time period. In certain embodiments, at least a portion of the optimization data is associated with a cash handling device identifier, and wherein the optimization data further causes the cash handling device to move cash stored within the cash handling device into a deposit cassette. In certain embodiments, at least two of the optimization parameters are interrelated.

Certain embodiments are directed to a computer program product comprising a non-transitory computer readable medium having computer program instructions stored therein, the computer program instructions when executed by a processor, cause the processor to: receive operational data from one or more cash handling devices, wherein the operational data received from each of the one or more cash handling devices comprises one or more of: (a) a cash handling device identifier, (b) cash handling device configuration data, (c) one or more register till identifiers, or (d) register till usage data associated with the one or more register till identifiers; generate, within the one or more memory storage areas, historical data based at least in part on the operational data received from one or more cash handling devices, wherein the historical data identifies till usage data associated with one or more register till identifiers over time; receive optimization parameters applicable to one or more register tills; generate, based at least in part on the optimization parameters and the historical data, optimization data associated with one or more register till identifiers; and transmit at least a portion of the optimization data to a cash handling device associated with one or more register till identifiers, wherein the optimization data causes the cash handling device to update locally stored executing instructions to implement the optimization data during cash dispensing processes for one or more register tills.

In various embodiments, receiving optimization parameters comprises receiving user input indicative of one or more optimization parameters applicable to one or more register tills. In certain embodiments, receiving optimization parameters comprises receiving optimization parameters associated with one or more register till identifiers to optimize cash distributions generated in association with the one or more register till identifiers. According to certain embodiments, receiving optimization parameters associated with one or more register till identifiers comprises receiving optimization parameters associated with a register group identifier, and wherein the register group identifier is associated with a plurality of register till identifiers. In various embodiments, generating optimization data associated with one or more register till identifiers comprises generating optimization data associated with at least one cash denomination and associated with at least one time period. In accordance with various embodiments, at least a portion of the optimization data is associated with a cash handling device identifier, and wherein the optimization data further causes the cash handling device to move cash stored within the cash handling device into a deposit cassette. In various embodiments, at least two of the optimization parameters are interrelated.

BRIEF DESCRIPTION OF THE SEVERAL VIEWS OF THE DRAWINGS

Reference will now be made to the accompanying drawings, which are not necessarily drawn to scale, and wherein:

FIGS. 9-10 illustrate example optimization parameters according to certain embodiments.

DETAILED DESCRIPTION

Figure 1:
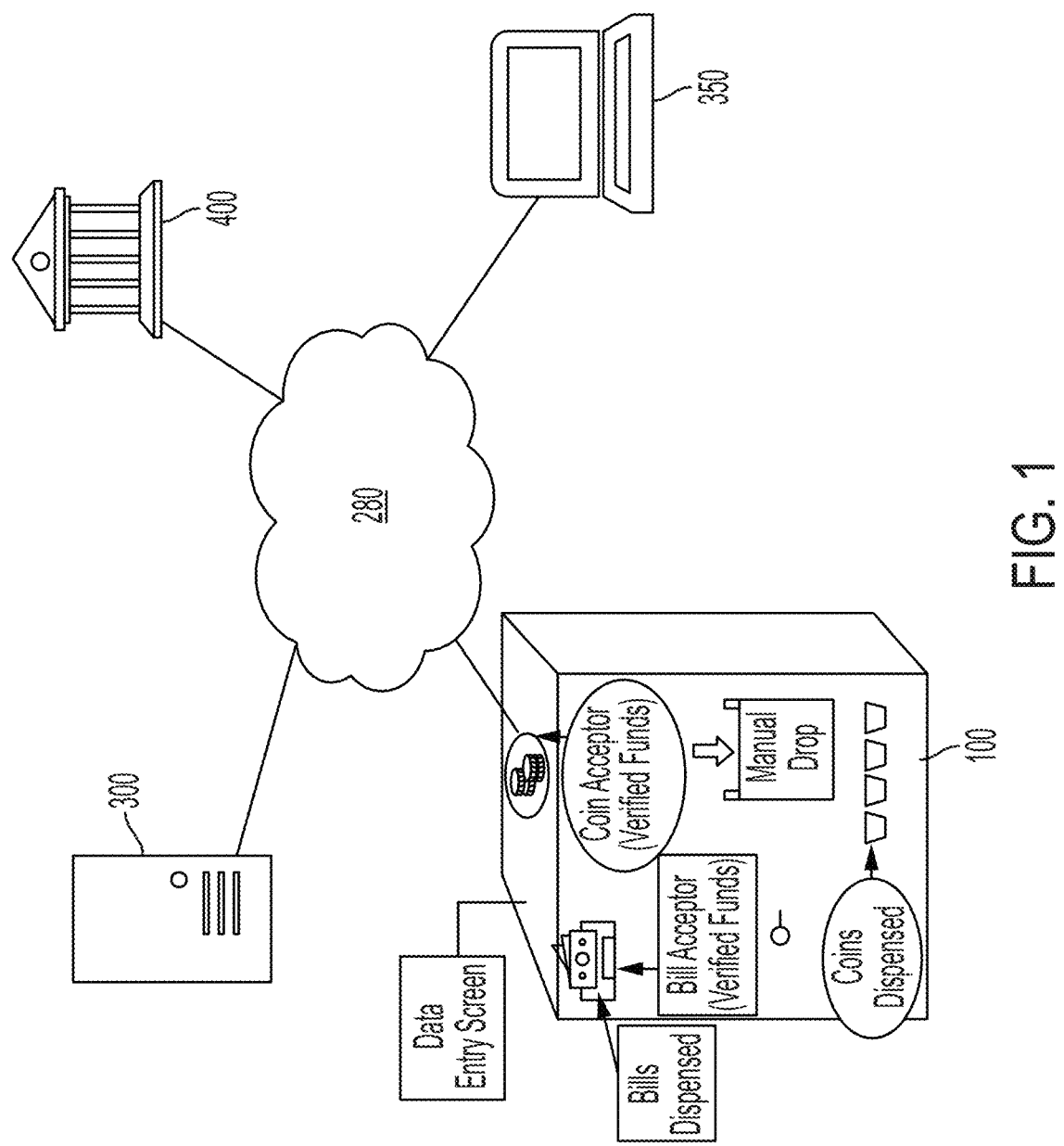
FIG. 1 illustrates a network environment in which data may be transferred regarding the functionality of a cash handling device according to certain embodiments.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Various embodiments are directed to systems and methods for automatically optimizing the amount of cash provided to one or more register tills based at least in part on historical data and/or one or more optimization parameters determined to apply to a particular register till. By optimizing the amount of cash within a register till, employees working with an optimized register till are less likely to require unscheduled advances and/or pick-ups (e.g., during a work shift) to add and/or remove cash from the register till. Moreover, the total amount of cash within register tills on a retail floor may be minimized for retail establishments, such that cash may be safely stored at a banking institution associated with the retail establishment. This reallocation of retail cash into a banking institution may increase free cash flow available for other uses of the retail establishment. Moreover, because the number of advances and/or pick-ups may be reduced for individual register tills, the lifespan of the mechanical components of the register tills may be maximized by decreasing wear-and-tear on those mechanical components associated with maintaining large cash reserves therein and/or associated with multiple, unscheduled pick-ups and/or advances to the register tills.

In certain embodiments, a monitoring server is in electronic communication with a plurality of cash handling devices. Each of those cash handling devices is configured to dispense cash into register tills and/or to receive cash deposited from register tills (e.g., at the beginning and end of a work shift, respectively). The monitoring server is configured to store data received from the one or more cash handling devices within a historical data repository, indexed based at least in part on register till identifiers.

Over time, the cash handling device(s) are configured to generate and/or store data indicative of the amount of cash distributed to each register till (e.g., at the beginning of a business day) and/or the amount of cash received from each register till (e.g., at the end of a business day). It should be understood that the register tills may be embodied as cash drawers utilized within traditional employee operated registered, or the register tills may be embodied as recycler cassettes utilized within self-checkout registers operated by customers. This till-specific data may be tracked (e.g., within the historical data repository of the monitoring server) at a denominational level (e.g., such that the cash handling device may generate data indicative of the amount of $20 bills distributed/received; the amount of $10 bills distributed/received; the amount of $5 bills distributed/received; and/or the like. However, it should be understood that other currencies and/or currency denominations may be utilized).

Accordingly, the monitoring server is configured to collect historical data regarding cash usage associated with each of a plurality of register tills. Such cash usage may be attributable to cash intake during purchase transactions (e.g., receiving cash from a customer), cash output during customer transactions (e.g., cash-back transactions initiated by a customer), cash changing (e.g., exchanging a large bill received from a customer for a comparable value of small bills given to the customer), and/or the like.

The till-specific and denomination-specific data may be provided to the monitoring server for the development of a cash usage model. The till-specific and denomination-specific data may be provided to the monitoring server at defined intervals (e.g., daily, hourly, and/or the like), such that the cash usage models, and/or the amount and/or mix of cash to be dispensed from a cash handling device for a particular till may be dynamically adjusted (e.g., by updating and/or generating appropriate data files at the monitoring server to be provided to the cash handling devices, as discussed herein) based on cash usage data from a previous (e.g., immediately previous) interval. Unique cash usage models may be developed for each of a variety of entities (e.g., a single retail location; a collection of retail locations; and/or the like) based at least in part on data received and/or stored at the monitoring server.

Moreover, the models may be developed to be interactive and adjustable based on one or more user-specified optimization parameters to be applied for specific register tills. The optimization parameters may be provided on a till-specific level, at a store-specific level, at a department-specific level (e.g., within a store), and/or at another level applying to a plurality of register tills. In embodiments in which the developed models accommodate a plurality of user adjustable parameters, those parameters may be entirely independent of one another, or two or more of the user adjustable parameters may be interdependent (such that adjusting one of the user adjustable parameters directly impacts another of the user adjustable parameters). As examples, the user adjustable parameters may comprise a comfort level (e.g., the amount of "extra" cash that should be maintained in a register till), an advance/pickup mix (e.g., defining how much of each of a plurality of denominations may be delivered to a register till simultaneously), a till max (e.g., the maximum amount of cash (in total or at a denomination level) that may be stored in a till; advance frequency (e.g., how often advances may be provided to a register till); a pickup frequency (e.g., how often cash may be picked-up from a register till); and/or the like.

Based at least in part on the historical data and/or the optimization parameters, the monitoring server utilizes the one or more models to generate optimization data for each of a plurality of register tills, wherein the optimization data is indicative of a determined optimal cash amount and/or denomination mix for a distribution to each of one or more register tills. As the amount of cash predicted to be utilized on a given day may be dependent on a number of factors (e.g., day of the week, day of the month, whether there are large-scale events occurring at the retail location, and/or the like), the optimal amount and mix of cash to be distributed to one or more register tills may be adjusted each day.

Upon determining the optimal amount and/or mix of cash (in total and/or at each denomination) to be distributed to each of one or more register tills, the monitoring server generates and transmits optimization data embodied as one or more data files to the appropriate cash handling device to adjust the operation of the cash handling device for distributing cash to register tills. The optimization data comprise data identifying each register till as well as cash distribution data indicative of the amount of cash to be distributed to each respective till. The optimization data is configured to update locally stored executing instructions indicative of the amount of cash to be dispensed to particular register tills, such that the optimized quantity of cash is dispensed into specific register tills by the cash handling devices. Data indicative of the amount of cash to be distributed to each respective till is identified at a denomination-specific level, such that the cash handling device distributes the appropriate amount of cash, in the appropriate denominations, to each register till. Optimization data may be generated by the monitoring server periodically (e.g., daily, weekly, and/or the like), such that the dispensing data utilized by cash handling devices to dispense cash into register tills is updated periodically to reflect updated optimization amounts for cash dispensed to register tills.

Certain embodiments enable real-time, dynamic, and/or entity specific adjustments to cash handling device operation for dispensing cash into register tills. Such adjustments may result in changes in the amount of cash (in total, or per denomination) dispensed by the cash handling device to one or more tills each day (or during other time periods, such as each week, each work-week and weekend (e.g., a first cash level may be provided during Monday-Friday and a second cash level may be provided during Saturday-Sunday). Utilizing a monitoring server in networked communication with one or more cash handling devices (which may themselves have limited functionality for tracking cash movement over time), the monitoring server may periodically and/or continuously monitor and adjust how cash contained within the cash handling device is dispensed into register tills for use in a retail setting (or other commercial setting).

In certain embodiments, the cash usage models are generated based on cash usage data collected from a plurality of cash handling devices, and accordingly the monitoring server appropriately gathers data generated at each of the plurality of disparate cash handling devices to develop accurate, time-dependent cash usage models that may be utilized to determine optimal cash distribution amounts for specific register tills.

Computer Program Products, Methods, and Computing Entities

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution). The terms software, computer program product, and similar words may be used herein interchangeably.

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media/memory).

In one embodiment, a non-volatile computer-readable storage medium may include a floppy disk, flexible disk, hard disk, solid-state storage (SSS) (e.g., a solid state drive (SSD), solid state card (SSC), or solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-recordable (CD-R), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Exemplary System Architecture

FIG. 1 provides an illustration of an exemplary embodiment of the present invention. As shown in FIG. 1, this particular embodiment may include one or more monitoring servers 120, one or more mobile devices 110, one or more cash handling devices as discussed herein, one or more networks 280 enabling communication among computing devices and a banking institution (e.g., a banking institution server system), and/or the like. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

Monitoring Server

Figure 2:
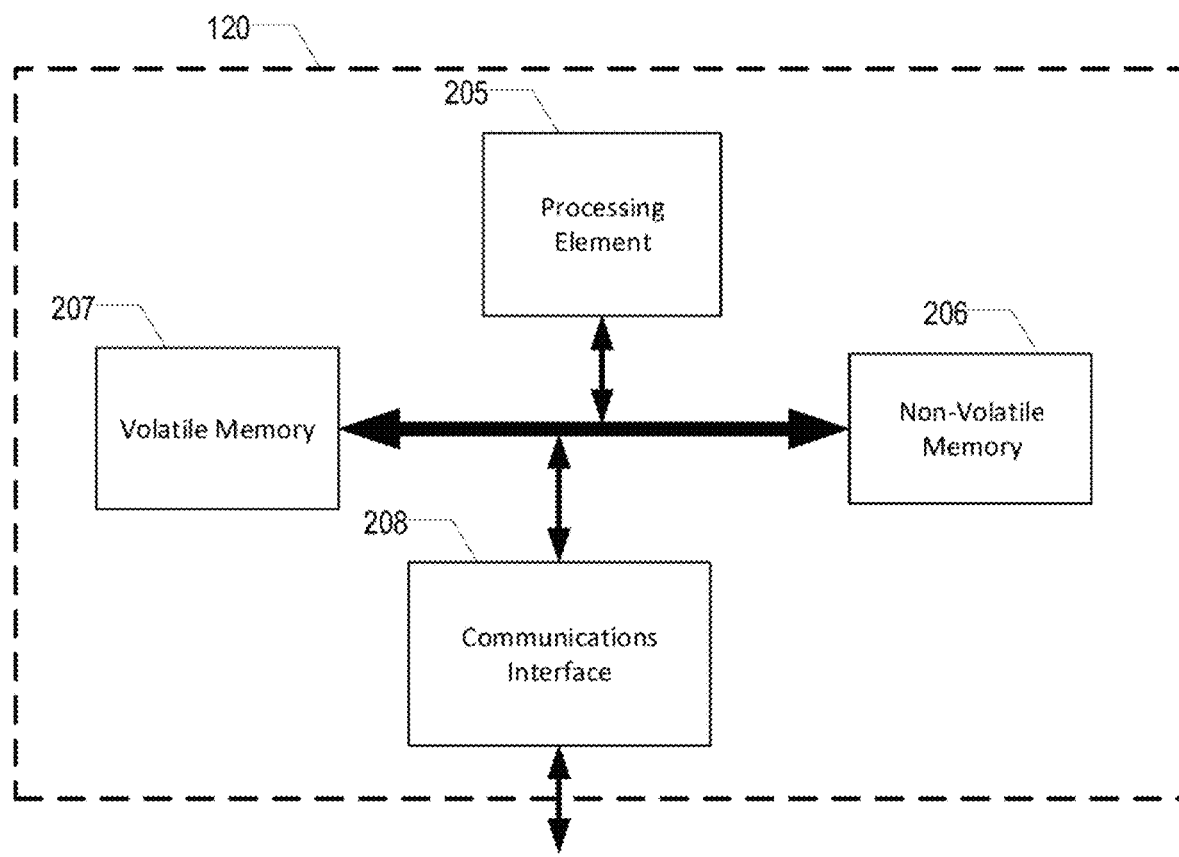
FIG. 2 schematically illustrates features of a monitoring server according to certain embodiments.

FIG. 2 provides a schematic of a monitoring server 120 according to one embodiment of the present invention. In one embodiment, the monitoring server 120 may be in network communication with one or more cash handling devices for monitoring transactions occurring in association with those cash handling devices, one or more banking institutions to transmit transaction data to appropriate banking institutions and/or one or more mobile devices 110 to provide various summary data thereto. In certain embodiments, the monitoring server 120 may be operable in association with other computing devices and/or platforms (e.g., operable via third parties, such as banking institutions' online banking platforms) to accomplish certain functions (e.g., user authentication) to retrieve certain data, and/or the like. In general, the terms computing entity, computer, entity, device, system, server, machine, and/or similar words used herein interchangeably may refer to, for example, one or more computers, computing entities, desktop computers, mobile phones, tablets, phablets, notebooks, laptops, distributed systems, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, controlling, remotely controlling, dispensing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

In one embodiment, the monitoring server 120 may include or be in communication with one or more monitoring server data repositories and/or one or more processing elements 205 (also referred to as processors, processing circuitry, processing device, and/or similar terms used herein interchangeably) that communicate with other elements within the monitoring server 120 via a bus, for example. In certain embodiments, the monitoring server data repositories may maintain a wide variety of data accessible to the monitoring server 120, such as user-specific items (e.g., user (login) ID, password (or other authentication credential(s)), one or more account number(s), user name, user registration status, and/or the like). As will be understood, the processing element 205 may be embodied in a number of different ways. For example, the processing element 205 may be embodied as one or more complex programmable logic devices (CPLDs), "cloud" processors, microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media/memory or otherwise accessible to the processing element 205. As such, whether configured by hardware or computer program products, or by a combination thereof, the processing element 205 may be capable of performing steps or operations according to embodiments of the present invention when configured accordingly.

In one embodiment, the monitoring server 120 may further include or be in communication with non-volatile media/memory (also referred to as non-volatile storage, memory, memory storage, memory circuitry and/or similar terms used herein interchangeably). In one embodiment, the non-volatile storage or memory may include one or more non-volatile storage or memory media 206, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or information/data that is stored in a computer-readable storage medium using one or more database models, such as a hierarchical database model, network model, relational model, entity-relationship model, object model, document model, semantic model, graph model, and/or the like.

In one embodiment, the monitoring server 120 may further include or be in communication with volatile media/memory (also referred to as volatile storage, memory, memory storage, memory circuitry and/or similar terms used herein interchangeably). In one embodiment, the volatile storage or memory may also include one or more volatile storage or memory media 207, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the monitoring server 120 with the assistance of the processing element 205 and operating system.

As indicated, in one embodiment, the monitoring server 120 may also include one or more communications elements/interfaces 208 for communicating with various computing entities, such as by communicating data, content, information, and/or similar terms used herein interchangeably that can be transmitted, received, operated on, processed, displayed, stored, and/or the like. For instance, the monitoring server 120 may communicate with one or more mobile devices 110, one or more cash handling devices, one or more networks 280, one or more banking institutions' computing systems, and/or the like.

In certain embodiments, the monitoring server 120 may be configured to receive data from a plurality of data sources with respect to cash inventory stored at a particular cash handling device (e.g., as a part of configuration data associated with a cash handling device). For example, the cash handling device may provide data indicative of aggregate inputs and outputs of cash to the machine, while a user computing device may provide data indicative of how the aggregate inputs and outputs are divided among a plurality of register tills (or registers, the terms being utilized herein interchangeably) (e.g., usable with respective POS devices). Accordingly, the monitoring server 120 may be configured to provide till-level inventory tracking configurations based at least in part on the aggregate amount of cash input to or output from a particular cash handling device, as well as manually generated data provided from a user computing entity indicative of how the cash was distributed from/to a various tills.

As just one example, a cash handling device may be configured to receive a till identifier when receiving cash from a particular till (e.g., via scanning a visual till identifier, such as a bar code, QR code, and/or the like; via user input providing a numeric, alpha- or alphanumeric till identifier; and/or the like). The cash handling device may thereafter be configured to generate and/or store denomination-specific cash usage and/or cash inventory data together with the till identifier, and/or other metadata that may be generated at the cash handling device (e.g., date/time data generated, a cash handling device identifier; an account identifier associated with the register till; a user identifier indicative of the user interacting with the cash handling device; and/or the like).

As indicated, in one embodiment, the monitoring server 120 may also include one or more communications interfaces 208 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the monitoring server 120 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The monitoring server 120 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

Although not shown, the monitoring server 120 may include or be in communication with one or more input elements, such as a keyboard input, a mouse input, a touch screen/display input, motion input, movement input, audio input, pointing device input, joystick input, keypad input, and/or the like. In one embodiment, the monitoring server 120 may also include or be in communication with one or more output elements (not shown), such as audio output, video output, screen/display output, motion output, movement output, and/or the like.

As will be appreciated, one or more of the monitoring server's 120 components may be located remotely from other monitoring server 120 components, such as in a distributed system. Furthermore, one or more of the components may be combined and additional components performing functions described herein may be included in the monitoring server 120. Thus, the monitoring server 120 can be adapted to accommodate a variety of needs and circumstances. As will be recognized, these architectures and descriptions are provided for exemplary purposes only and are not limiting to the various embodiments.

Exemplary Mobile Device

In one embodiment, a user may be an individual, a representative of a customer, such as a company or organization, and/or the like who wants to deposit and/or withdraw cash from a cash handling device as discussed above. The user may interact with a cash handling device via a user interface thereon, and/or the user may interact with a mobile device 110 to obtain information/data regarding one or more accounts to which the user has access. As will be recognized, an account associated with a cash handling device may be any of a number of different account types, including a bank-owned cash account, a non-bank owned cash account, and/or the like. Accounts may be associated and/or linked with any of a variety of banking institutions holding accounts on behalf of a customer. Moreover, an account could be associated with more than one user (e.g., a plurality of employees associated with a customer holding an account), and each user may have different account access credentials (e.g., a first user may have withdrawal and deposit access and a second user may have deposit only access to an account). Moreover, each user may have access to an account via different access identifiers (e.g., different user identifiers), or in certain embodiments each user may have access to the account via an identical access number. In other embodiments, a single user identifier may be associated with more than one account (e.g., accounts associated with a plurality of departments within a commercial customer).

Figure 3:
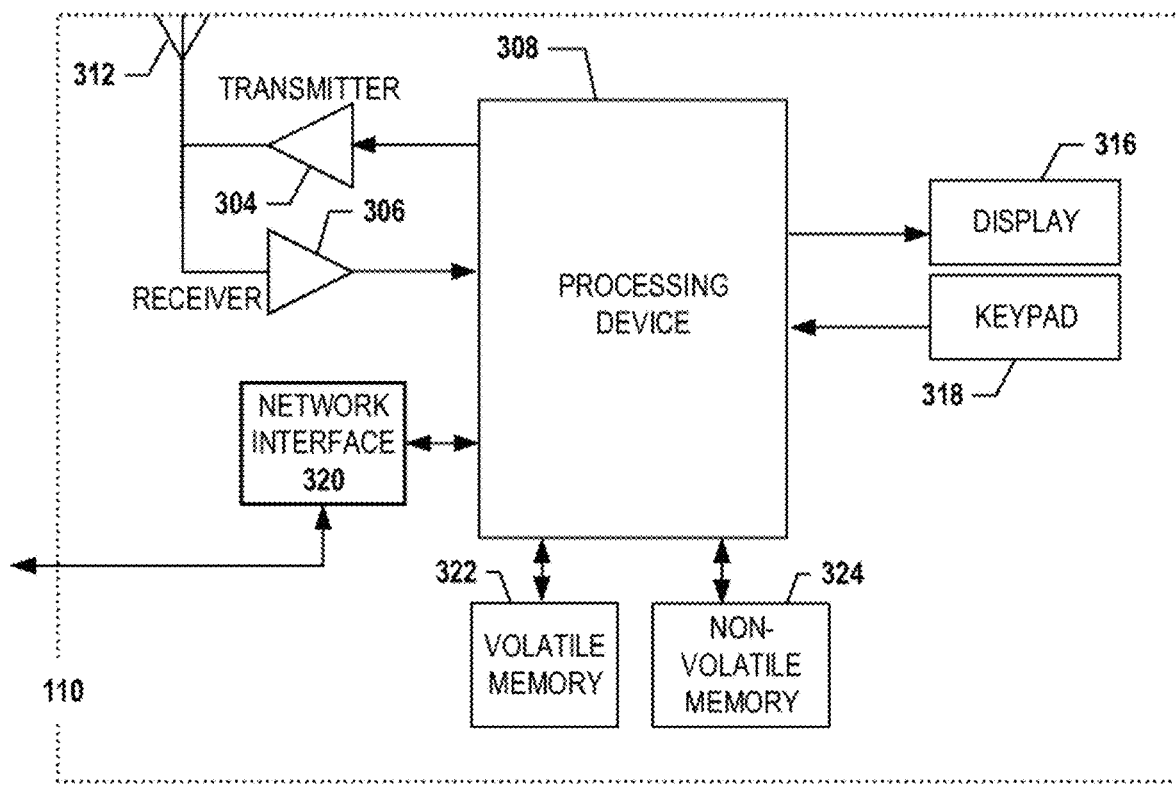
FIG. 3 schematically illustrates features of a handheld device according to certain embodiments.

The mobile device 110 includes one or more components that are functionally similar to those of the monitoring server 120. FIG. 3 provides an illustrative schematic representative of a mobile device 110 that can be used in conjunction with embodiments of the present invention. As noted previously, the terms device, system, computing entity, entity, server, and/or similar words used herein interchangeably may refer to at least, for example, one or more computers, computing entities, mobile phones, tablets, phablets, watches, glasses, ear pieces, wristbands, wearable items/devices, the like, and/or any combination of devices or entities adapted to perform the functions, operations, and/or processes described herein. As shown in FIG. 3, the mobile device 110 can include an antenna 312, a transmitter 304 (e.g., radio), a receiver 306 (e.g., radio), and a processing element 308 (e.g., CPLDs, microprocessors, multi-core processors, cloud processors, coprocessing entities, ASIPs, microcontrollers, and/or controllers) that provides signals to and receives signals from the transmitter 304 and receiver 306, respectively.

In one embodiment, the signals provided to and received from the transmitter 304 and the receiver 306, respectively, may include signaling information/data in accordance with air interface standards of applicable wireless systems. In this regard, the mobile device 110 may be capable of operating with one or more air interface standards, communication protocols, modulation types, and access types. More particularly, the mobile device 110 may operate in accordance with any of a number of wireless communication standards and protocols, such as those described above with regard to the monitoring server 120. In a particular embodiment, the mobile device 110 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the mobile device 110 may operate in accordance with multiple wired communication standards and protocols, such as those described above with regard to the monitoring server 120 via a network interface 320.

Via these communication standards and protocols, the mobile device 110 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). In one embodiment, the mobile device 110 can also download changes, add-ons, and updates, for instance, to its firmware, software (e.g., including executable instructions, applications, program modules), and operating system.

According to one embodiment, the mobile device 110 may include location determining aspects, devices, modules, functionalities, and/or similar words used herein interchangeably. For example, the mobile device 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). In one embodiment, the satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the mobile device's 110 position in connection with a variety of other systems, including cellular towers, Wi-Fi access points, and/or the like. Similarly, the mobile device 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, Bluetooth Smart, Wi-Fi Direct transmitters, NFC transmitters, and/or the like. These indoor positioning aspects can be used in a variety of settings to determine the location of someone or something to within inches or centimeters.

In one embodiment, the mobile device 110 may also comprise a user interface (that can include a display 316 coupled to a processing element 308) and/or a user input interface (coupled to a processing element 308). For example, the user interface may be a user application, browser, user interface, interface, and/or similar words used herein interchangeably executing on and/or accessible via the mobile device 110 to interact with and/or cause display of information/data from the monitoring server 120, as described herein. The user input interface can comprise any of a number of devices or interfaces allowing the mobile device 110 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the mobile device 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

In certain embodiments, the user interface (e.g., the display 316) may be configured for displaying access credentials that may be presented to a cash handling device to enable the user to gain account access via the cash handling device. For example, the user interface of the mobile device 110 may be utilized to display a QR code, a bar code, an image, and/or the like that is machine-readable and indicative of the user's access credentials. Similarly, the mobile device 110 may be configured for storing access credentials thereon, and transmitting those access credentials via any of a variety of wireless data transmission protocols (e.g., Bluetooth, Wi-Fi, NFC, and/or the like) to the cash handling device to provide access credentials for the user to the cash handling device.

The mobile device 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the mobile device 110. As indicated, this may include a user application that is resident on the entity or accessible through a browser or other user interface for communicating with the monitoring server 120 and/or various other computing entities.

As will be recognized, the mobile device 110 may include one or more components or functionality that are the same or similar to those of the monitoring server 120, as described in greater detail above. As will be recognized, these architectures and descriptions are provided for exemplary purposes only and are not limiting to the various embodiments.

Cash Handling Device Hardware

Figure 4:
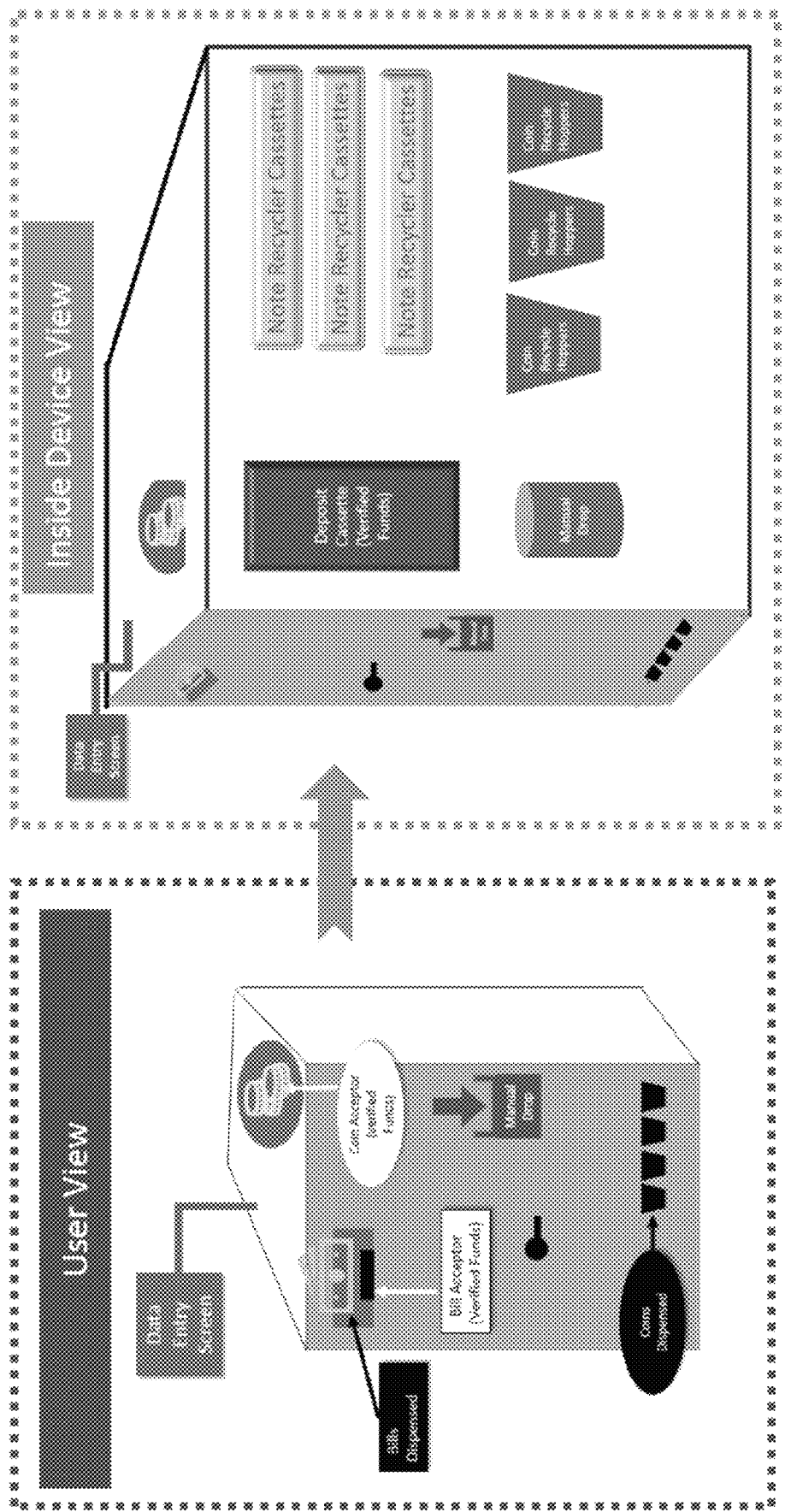
FIG. 4 schematically illustrates features of a cash handling device according to certain embodiments.

An example cash handling device is shown schematically at FIG. 4. As shown therein, components of the cash handling device are disposed within and/or on a housing. The cash handling device may comprise a user interface (e.g., an LCD monitor, a PIN-pad, and/or the like), one or more data readers (e.g., a card reader, a barcode reader, an NFC reader, a camera (which may also be utilized for recording security footage), a biometric reader, and/or the like). In certain embodiments, the cash handling device hardware may comprise one or more secure information storage areas configured to securely store user data (e.g., user identifiers, user passwords/passcodes, user biometric data, and/or the like) to prevent unauthorized access to such user data. These secure information storage areas may be accessible to certain authorized users, thereby enabling those authorized users to add or remove user data, for example, as new employees/users become authorized to interact with the cash handling device and/or as prior employees/users are no longer authorized to interact with the cash handling device.

The cash handling device may further comprise one or more currency outputs (e.g., a coin dispenser, such as a rolled coin dispenser or a loose coin dispenser, a note dispenser, such as a loose note dispenser or a bound-note dispenser, and/or the like), one or more currency and/or negotiable instrument inputs (e.g., a coin recycler, a check/note scanner/recycler, a deposit cassette, and/or the like), a receipt printer, and/or the like. As discussed herein, the cash handling device may additionally comprise a register till receiving portion configured to receive a register till during receipt and/or distribution of cash stored within the register till. In certain embodiments, the register till receiving portion may further comprise a register till identifier scanner configured to obtain register till identifier data for tills located therein, such that data indicative of cash added to and/or removed from the register till may be associated with the register till identifier.

The cash handling device components collectively enable a user (e.g., a representative of a particular commercial establishment customer having an account accessible via the cash handling device) to deposit and/or withdraw funds from the cash handling device (which may result in corresponding changes to an account balance in an account held at a particular banking institution for the commercial establishment). In certain embodiments, the cash handling device may enable users to withdraw currency in requested quantities and denominations (e.g., requested quantities of each of a plurality of denominations). Users may interact with the cash handling device via the one or more user interface mechanisms to (1) provide user identifying data (e.g., via the one or more data readers, the PIN pad, a touch screen, and/or the like), and (2) to provide data indicative of a requested transaction to be performed with the cash handling device.

In certain embodiments, a plurality of users may be associated with a single account with the cash handling device, and each of those users may be associated with differing account access levels. For example, a first user may have deposit and withdrawal access for a particular account, while a second user may only have deposit access for the particular account. Data indicative of the access credentials for each user may be stored locally in a non-transitory memory of the cash handling device, on a memory within a physical identification token (e.g., a card) carried by the user, and/or the like.

With reference to FIG. 4, which illustrates a schematic view of various components of a cash handling device according to one embodiment, the cash handling device may comprise one or more components of a note (e.g., note) circulation system and one or more components of a coin circulation system.

In the illustrated embodiment, the note circulation system encompasses a note acceptor configured for providing notes to a user and/or for accepting notes deposited by a user. The note acceptor may be configured for processing a plurality of notes simultaneously (e.g., presented to the note acceptor in a stack) to speed transactions with the user. Notes passed between the note acceptor and one or more note recycler cassettes and/or deposit cassettes (illustrated in FIG. 4) are counted, imaged, and/or otherwise verified to monitor the quantity of notes deposited/withdrawn, as well as the denomination of those notes. Through the verification mechanism of the note acceptor, the note circulation system may be configured to separate out negotiable instruments (e.g., checks) and/or certain notes for direction to separate storage locations, and/or to separate out and return unreadable notes and/or unreadable negotiable instruments to a user. In certain embodiments, those unreadable notes and/or unreadable negotiable instruments may be resubmitted by the user via a manual drop system, and the user may manually provide information regarding the denomination of the particular notes provided to the cash handling device via the manual drop.

As is particularly relevant for deposits, the note acceptor may be configured for segregate notes by denomination prior to providing those notes to a note recycler and/or deposit cassette. The segregated notes may be stored in separate storage locations (e.g., separated portions of a recycler cassette and/or separated portions of a deposit cassette) such that the notes may be easily recycled based on denomination for later transactions if needed. In certain embodiments, the separate storage locations may comprise separate deposit cassettes, separate recycler cassettes, and/or separated portions of a deposit cassette and/or recycler cassette. As a specific example utilized with U.S. currency, a cash handling device may comprise two cassettes (deposit cassettes, recycler cassettes, or both) configured for receiving and/or dispensing $1 bills, a third cassette (deposit, recycler, or both) configured for receiving and/or dispensing $5 bills, a fourth cassette (deposit, recycler, or both) configured for receiving and/or dispensing $20 bills, a fifth cassette (deposit, recycler, or both) divided into separate sections, a first section for receiving and/or dispensing $5 bills and a second section for receiving and/or dispensing $10 bills. A sixth cassette (deposit only) may be configured for receiving overflow of any denomination of note (including $1, $2, $5, $10, $20, $50, and $100) when a respective denomination-specific cassette is full and/or if no denomination specific cassette is provided for a particular note. For clarity, a cash handling device may comprise deposit only cassettes having the above-referenced configuration, recycler only cassettes having the above-referenced configuration (except for the deposit-only overflow cassette) or may have two sets of cassettes having the above-referenced configuration (e.g., a first set of deposit cassettes having the above-referenced configuration and a second set of recycler cassettes having the above-referenced configuration, but without the overflow cassette). It should be understood that the configuration of specific denomination-specific cassettes mentioned above is presented as an example only, and any combination of denomination-specific cassettes may be utilized.

In certain embodiments, all notes received from the note acceptor during deposit transactions are first directed to a note recycler cassette for storage therein. Notes may be redirected from a recycler cassette to a deposit cassette to remove those notes from circulation upon the occurrence of one or more trigger events, such as a quantity of notes (e.g., a quantity of a given denomination of notes) exceeding a threshold quantity or upon receipt of user input requesting that notes are moved to the deposit cassette. Moreover, as discussed herein, movement of notes to a deposit cassette may itself be a trigger event for various tasks to be performed by the cash handling device or a networked monitoring system, such as transmitting data to a banking institution to direct funds into a particular account at the banking institution.

In certain embodiments, each time notes are moved within the cash handling device, the notes may pass through a quantity and/or denomination verification system to automatically monitor the amount of currency moving between the various portions of the cash handling device, thereby enabling the cash handling device to maintain an accurate count of the amount of currency in each denomination contained therein.

With reference now to the coin circulation system, the cash handling device may be comprise a coin acceptor configured to accept coins deposited by a user of the cash handling device (e.g., accepting rolled coins and/or loose coins). The coin acceptor may have a rejection tray configured to return any unrecognizable coins deposited by the user. Moreover, the coin acceptor comprises a counting and/or verification system configured for counting the quantity and denomination of coins provided via the coin acceptor. Coins may then be passed to one or more coin recycle hoppers (e.g., which may comprise open trays, roll-creating hoppers, and/or the like) for storage within the cash handling device. In certain embodiments, those coin recycle hoppers may be configured for selectably dispensing coins as needed to fulfill a withdrawal request (e.g., as loose coins or as rolled coins). In such embodiments, the coins may be passed to one or more coin dispensing trays (e.g., coin roll dispensing trays or loose coin dispensing trays) for presentation to the user.

Like the note recyclers mentioned above, the cash handling device may comprise a plurality of denomination specific coin hoppers for storage of deposited coins. For example, a cash handling device may comprise a two coin hoppers configured for storing $0.01 coins therein, another two coin hoppers configured for storing $0.05 coins therein, a fifth coin hopper configured for storing $0.10 coins therein, sixth and seventh coin hoppers configured for storing $0.25 coins therein, and an eighth, overflow coin hopper configured for storing coins of any denomination (such as $0.01, $0.05, $0.10, $0.25, $0.50, and $1). A cash handling device may comprise deposit only coin hoppers having the above configuration, recycler coin hoppers having the above configuration, or both recycler coin hoppers and deposit coin hoppers having the above configuration. Moreover, the configuration of denominations of coin hoppers discussed herein is provided merely as an example, any combination of denomination-specific coin hoppers may be utilized.

Moreover, the cash handling device may comprise a manual drop circulation system comprising a manual drop acceptor configured to accept notes and/or negotiable instruments provided by the user, and a manual drop storage cassette. The manual drop acceptor may operate in conjunction with the user interface, such that the manual drop may associate user-provided information regarding the quantity of a particular manual drop (e.g., value, quantity of a particular currency, and/or the like) with notes accepted via the manual drop. In certain embodiments, the manual drop cassette may be configured to separate each collection of notes accepted via the manual drop, such that the user-provided information regarding the quantity of currency provided via the manual drop may remain reflective of an amount of currency stored within a particular separated collection of notes. The manual drop may be a deposit only system, such that notes are not recycled to users from the manual drop cassette.

Although not shown, the cash handling device may be configured for automatically providing cash into a cashier tray (e.g., a tray to be utilized with a cash register at a Point-of-Sale (POS) terminal). In such embodiments, the cashier tray may be supported within the cash handling device, and the cash handling device may selectably deposit quantities of notes and coins of select denominations into segmented portions of the cashier tray.

Moreover, the cash handling device comprises a receipt printer configured for printing physical receipts that may be usable by individual users and/or during change order processing as discussed herein.

Cash Handling Device Controller

A cash handling device having the physical configuration discussed herein may have one or more onboard computing controllers configured for performing various functions and/or for controlling the functionality of various components of the cash handling device. In one embodiment, the cash handling device controller is embodied as a computing entity that may have a configuration similar to the mobile device 110 discussed above, and which may be configured to support processing in connection with deposit and withdrawal transactions for funds via the cash handling device. The one or more cash handling device controllers may include computing device(s) that are local to a corresponding cash handling device and/or computing device(s) that are remotely located. At least one of the cash handling device controllers may be configured to access and store information/data in at least one of one or more datastores to perform processing supported by the cash handling device.

As just one example, the cash handling device controller may be configured to monitor the amount of each of a plurality of denominations of cash that are dispensed and/or collected during a deposit or withdrawal transaction. When dispensing cash into a register till, the cash handling device controller may store a till identifier for which dispensing is performed, and may store data indicative of the amount of cash (and the denominations of those distributions) dispensed into the register till. Additional metadata associated with the transaction may also be stored, such as the date and/or time of dispensing, a user identifier associated with the transaction, and/or the like. The cash handling device controller may provide the stored data of the transaction to the monitoring server (e.g., by transmitting the transaction-specific data via a network) for further processing. Similarly, when receiving cash deposited from a register till, the cash handling device controller may store a till identifier for which dispensing is performed, and may store data indicative of the amount of cash (and the denominations of those deposits) deposited from the register till. Additional metadata associated with the transaction may also be stored, such as the date and/or time of dispensing, a user identifier associated with the transaction, and/or the like. The cash handling device controller may provide the stored data of the transaction to the monitoring server (e.g., by transmitting the transaction-specific data via a network) for further processing.

Exemplary Networks

In one embodiment, any two or more of the illustrative components of the architecture of FIG. 1 may be configured to communicate with one another via respective communicative couplings to one or more networks 280. The networks 280 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 280 may have any suitable communication range associated therewith and may include, for example, global networks (e.g., the Internet), metropolitan area networks (MANs), wide area networks (WANs), local area networks (LANs), or personal area networks. In addition, the networks 280 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

Transmissions over networks 280 may be "in the clear" or may leverage one of more of a variety of industry-standard or third-party security technologies implemented in any of the OSI layers used. If encryption is used, it may be symmetric or asymmetric (or implement a combination of the two, as in SSL/TLS, where the initial handshake uses asymmetric encryption in the exchange of symmetric keys, and subsequent transactions use symmetric encryption based on the previously exchanged symmetric keys). As will be recognized, process interaction over a network may be synchronous or asynchronous: synchronous-processes are coupled and include web services (e.g., SOAP), which may in turn leverage http(s); and various other remote procedure call (RPC), middleware protocols, industry-standard exchange formats (e.g., XML or JSON), and integration architectures (e.g., REST) and/or asynchronous-processes are decoupled and mechanisms include message queues and file transfers.

Exemplary System Operation

As discussed herein, various embodiments are directed to systems and methods for updating the operation of one or more cash handling devices so as to optimize the amount of cash dispensed by the cash handling devices into individual register tills. Discussions of certain embodiments are provided with reference to FIGS. 5-11B.

As indicated above, the monitoring servers are configured for generating and/or maintaining one or more cash utilization models based on cash dispensing and receiving data generated at one or more cash handling devices. Thus, the monitoring server periodically and/or continuously receives cash usage data (e.g., in the form of transaction-specific data associated with deposit and/or withdrawal transactions) from one or more cash handling devices, assigns appropriate account and/or entity identifier data with the received cash usage data (such that cash usage data is utilized as input for appropriate models), and stores the cash usage data in one or more databases for usage in generating and/or maintaining cash utilization models. As discussed herein, the monitoring server may be configured to communicate with one or more cash handling devices utilizing one or more communication protocols. Moreover, data received from the one or more cash handling devices may be encrypted utilizing one or more encryption protocols, and accordingly the monitoring server may be configured to appropriately decrypt data received from the cash handling devices.

Optimization of the operation of cash handling devices, specifically with respect to dispensing of cash to register tills may be performed at a monitoring server 120, and optimization data indicative of the results of one or more optimization processes may be transmitted to individual cash handling device controllers so as to implement the optimization of cash handling device operation. Thus, the monitoring server 120 of certain embodiments is in electronic communication with one or more cash handling device controllers via one or more networks 280.

Input Data Receipt

Figure 5:
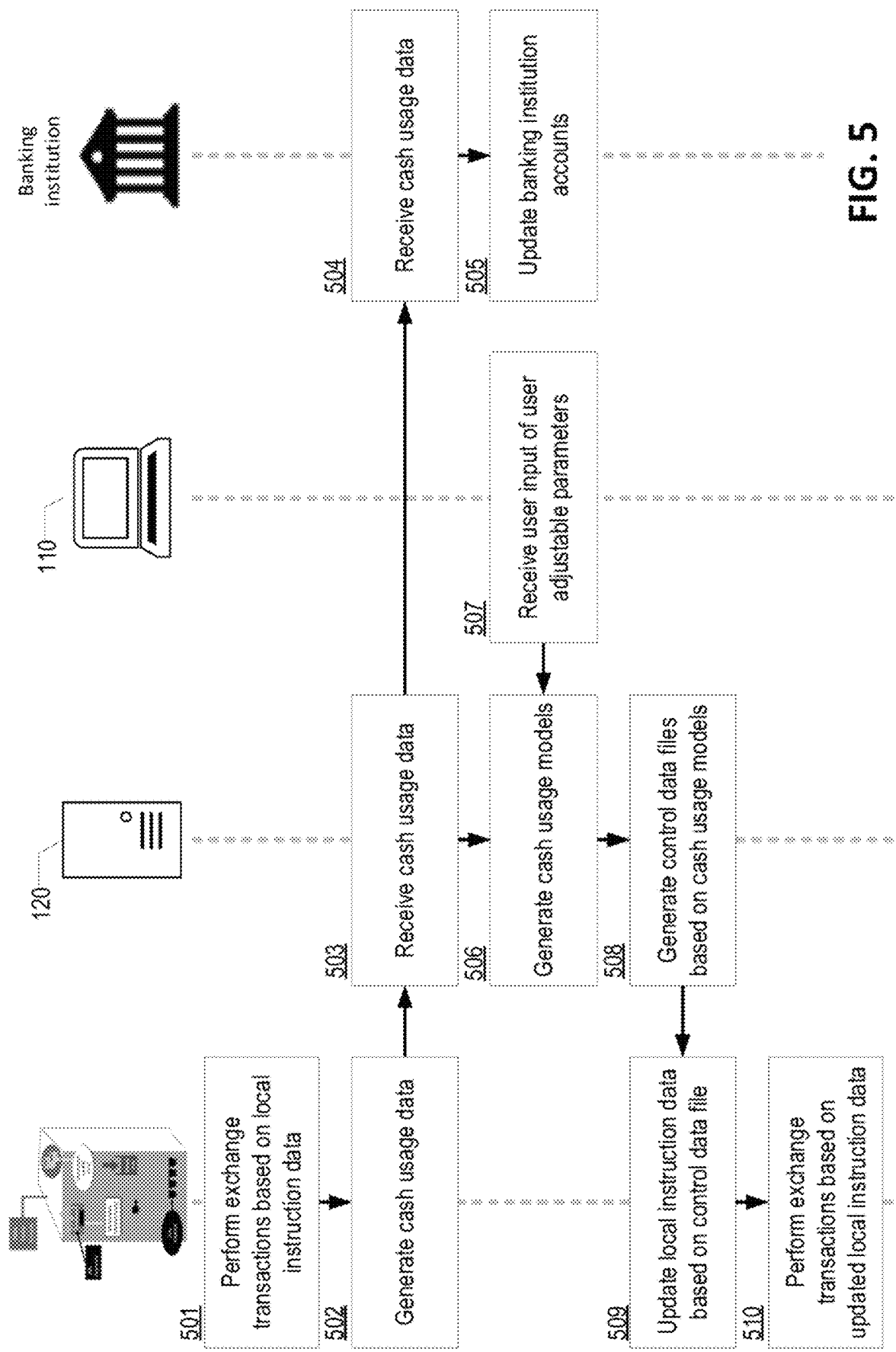
FIGS. 5-6 are flowcharts illustrating various actions performed by computing entities of certain embodiments.
Figure 6:
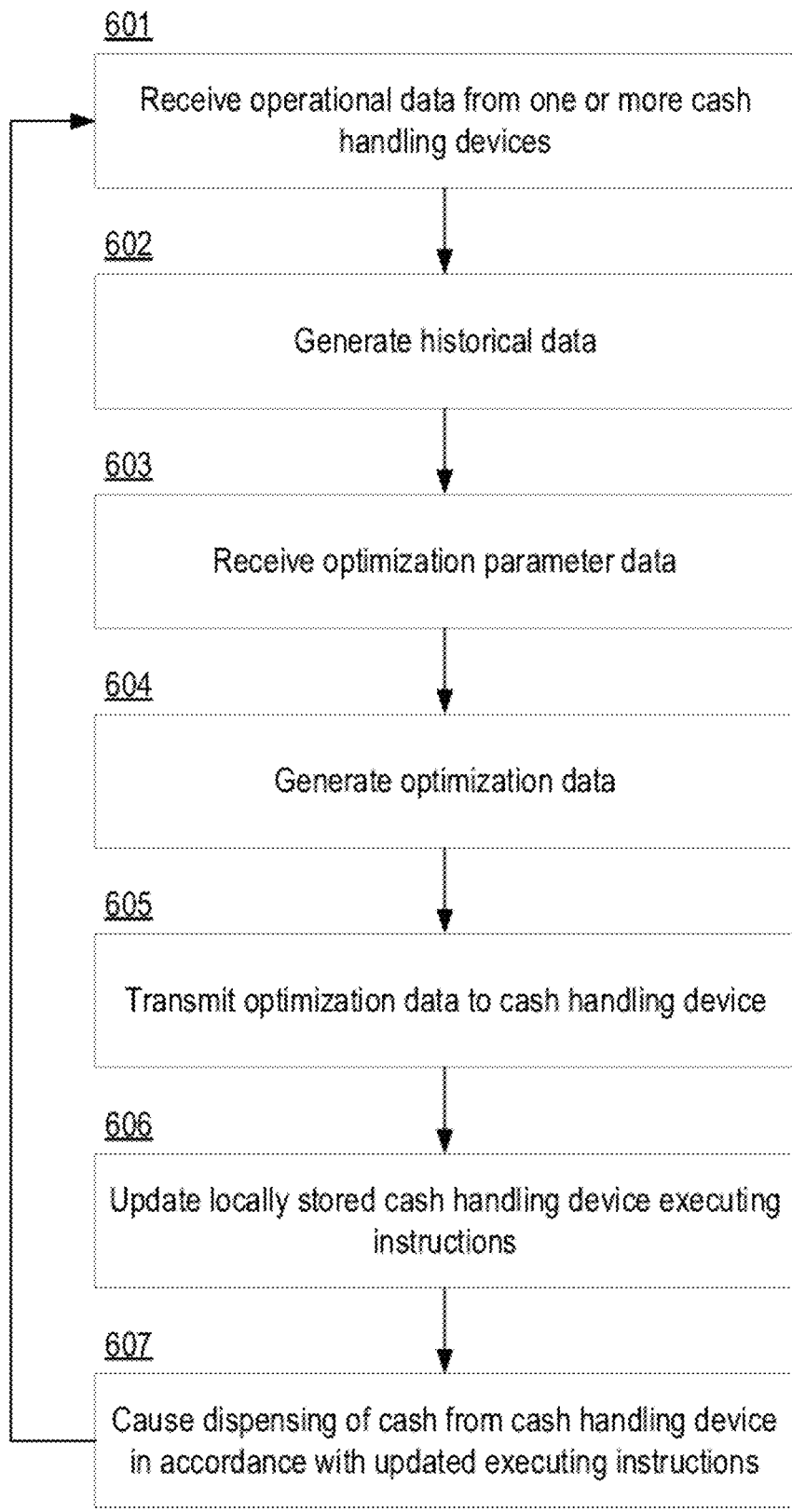

FIG. 5 specifically illustrates operations performed by one or more computing entities in accordance with certain embodiments, and FIG. 6 provides additional detail regarding processes performed in association with a monitoring server 120 according to various embodiments. As illustrated at Blocks 501-502, operational data, including cash usage data is generated at cash handling devices, for example, based at least in part on exchange transactions performed at the cash handling device. The operational data is transmitted to the monitoring server 120, as reflected at Block 503 of FIG. 5 and Block 601 of FIG. 6.

In various embodiments, the operational data may be indicative of various operations performed by the cash handling devices (e.g., including cash utilization data indicative of physical cash dispensed and/or received at the cash handling device via exchange transactions), as well as configuration data associated with the cash handling devices. In certain embodiments, the cash handling devices may not be capable of storing operational data over a period of time, and accordingly the operational data received at the monitoring server 120 may be indicative of current and/or recent operations performed by the one or more cash handling devices.

In various embodiments, the operational data received from cash handling devices comprises a cash handling device identifier embodied as data uniquely identifying the cash handling device from which the operational data is received. As just one example, the cash handling device identifier may be embodied as a unique character string, a word, an alphanumeric character string, and/or the like. The unique identifier may be contextually relevant to the location of the cash handling device. For example, if a cash handling device is located at "Jim's General Store" in Anytown, GA, the unique identifier may be embodied as "JimsGeneralAnytown001." It should be understood that the unique identifier may have any of a variety of formats.

The operational data may additionally comprise cash handling device configuration data indicative of various characteristics of the cash handling device. The configuration data may indicate the type of cash handling device (e.g., a brand and/or model name/identifier). Moreover, the configuration data may indicate specific characteristics of the cash handling device, such as the capacity of one or more recycler cassettes for each of a plurality of denominations (e.g., the capacity of $20 bills that may be placed within a corresponding recycler cassette), the capacity of one or more deposit cassettes, and/or the like. In various embodiments, the configuration data may additionally indicate whether the cash handling device is configured to automatically request change orders, for example, upon cash within the cash handling device reaching one or more thresholds (e.g., a minimum threshold or a maximum threshold). It should be understood that additional configuration data may be provided as a part of the operational data in certain embodiments.

In various embodiments, the operational data may additionally comprise cash utilization data indicative of cash usage via one or more register tills associated with the cash handling device. As discussed herein, cash handling devices may be utilized to dispense cash into one or more register tills for usage (e.g., at the beginning of a work shift) and/or to receive cash from one or more register tills (e.g., at the end of a work shift). Accordingly, the operational data may comprise register till-specific cash usage data, which may be provided at a denominational level.

Cash utilization data may be generated at one or more cash handling devices based at least in part on physical cash dispensed and/or received at the cash handling device. As mentioned above, during cash exchange transactions in which cash is dispensed from the cash handling device (e.g., to a particular register till) and/or cash is deposited into the cash handling device (e.g., from a particular register till), the cash handling device monitors the amount of cash involved in the particular transaction, as reflected at Block 501 of FIG. 5. The cash handling device may monitor the amount of cash that is dispensed out of the cash handling device and/or the amount of cash received into the cash handling device via cash verification mechanisms (e.g., optical-based cash verification mechanisms). In addition to monitoring the amount of cash within recycler cassettes and/or deposit cassettes of the cash handling device, the cash handling device may utilize the transaction-specific data to monitor the difference in the amount of cash dispensed and the amount of cash received (e.g., during defined time periods). Based on the monitored activity of exchange transactions, the cash handling device generates cash usage data reflecting local exchange transactions performed at the cash handling device, as reflected at Block 502 of FIG. 5.

The cash utilization data may comprise data indicative of a register till identifier, a user identifier, and/or the like associated with the particular transaction. An identifier associated with the transaction enables monitoring of cash usage associated with the particular transaction over time. For example, utilizing a register till identifier, the amount of cash utilized (e.g., in the aggregate and/or at a denomination-specific level) during a particular time period (e.g., one business day) may be tracked and monitored over time, to monitor changes in the amount of cash usage associated with the particular register till. Similar tracking and/or monitoring may be provided for particular users, if applicable. Like the cash handling device identifiers discussed above, the register till identifiers (and/or user identifiers) may be provided in any of a variety of formats, including alphanumeric strings, words, and/or the like. The register till identifiers may be contextually indicative of the location of the register till (e.g., PHARMACY001 may be indicative of a register till used in the pharmacy department of a particular retail establishment).

Figure 7:
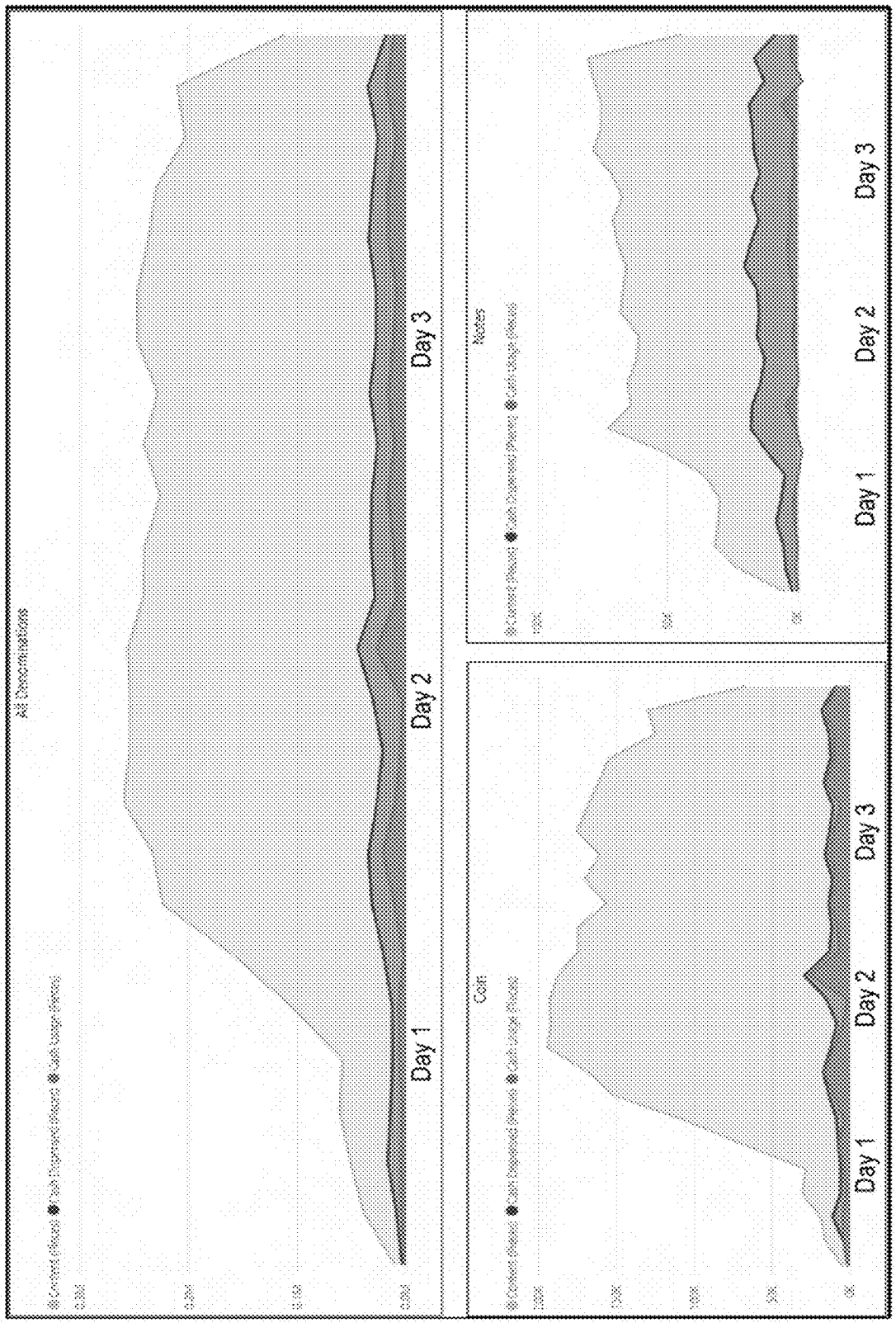
FIGS. 7-8 illustrate example historical data according to certain embodiments.
Figure 8:
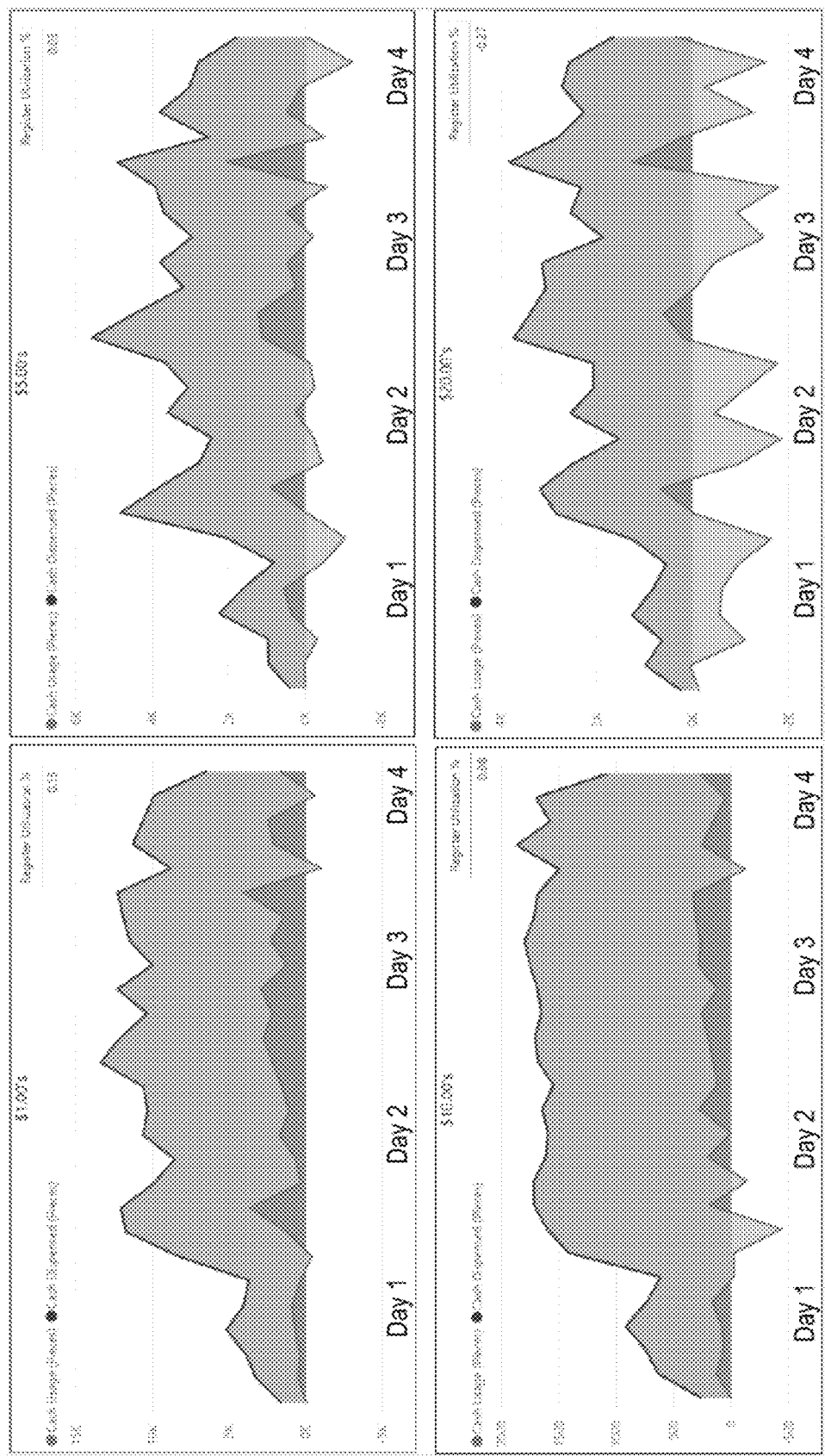

In various embodiments, the operational data may additionally comprise register till usage data, indicative of historical cash usage by each of a plurality of register tills. The register till usage data is associated with the register till identifiers, thereby enabling a determination of the usage of cash at a specific register till. FIGS. 7-8 illustrate example register cash usage data in accordance with one embodiment. As shown therein, the register cash usage data may encompass overall cash usage (e.g., by value of cash, by number of pieces, such as the number of bills, number of coins, and/or the like), and/or the register cash usage data may encompass denomination-specific cash usage. As illustrated specifically in FIG. 8, the register cash usage data may encompass usage data for $1 bills, for $5 bills, for $10 bills, for $20 bills, and/or the like.

Moreover, the register cash usage data may identify the amount of cash dispensed to a particular register till (e.g., based on number of pieces) as well as the amount of cash utilized at the particular register till (e.g., based on number of pieces). In various embodiments, the usage data may additionally comprise a till utilization percentage-indicative of the percentage of cash dispensed that is ultimately utilized at the register till.

As discussed herein, cash handling devices may be incapable of storing historical data indicative of register utilization, and accordingly the operational data received from a particular cash handling device may encompass cash utilization data for a single time period (e.g., a single day, a single time period since operational data was previously transmitted to the monitoring server 120, and/or the like). With reference to FIGS. 7-8 for example, each reflected Day within the illustrated charts may encompass data received by the monitoring server 120 during separate data transmissions to the monitoring server 120.

Cash utilization data may be transmitted to the monitoring server in real-time, periodically, and/or continuously. For example, upon generation of cash usage data for a particular transaction, the cash handling device may be configured to transmit the data to the monitoring server in real time. As another example, the cash handling device may be configured to transmit the cash utilization data in a batch process at defined intervals (e.g., once per day, once per hour, and/or the like). If applicable, cash utilization data may be transmitted to a banking institution as well (either directly from the cash handling device or by being relayed (with or without modification, as applicable) by the monitoring server 120. The banking institution may receive the cash utilization data, as shown at Block 504 of FIG. 5, and may update banking institution accounts, if necessary (as shown at Block 505). For example, banking institution accounts may be updated to reflect provisional cash deposits for a banking institution account, hard cash deposits, cash withdrawals, and/or the like, based on the exchange transactions performed at the cash handling device.

The monitoring server receives the cash utilization data (as reflected by Block 503 of FIG. 5), and assigns additional classification data to the cash utilization data for use in generating cash utilization models (as reflected at Block 506). The classification data may comprise an entity identifier, a location identifier, and/or the like, to enable grouping of cash utilization data received from a plurality of disparate cash handling devices. As examples, data received from a plurality of cash handling devices all associated with a single entity identifier may be grouped for concurrent analysis; data received from a plurality of cash handling devices all having location identifiers of nearby locations (e.g., existing within a defined radius of one another) may be grouped for concurrent analysis; and/or the like. Moreover, as mentioned above, the cash utilization data itself may comprise data subsets indicative of cash utilization of particular user identifiers and/or register till identifiers-those user identifiers and/or register till identifiers may be at least partially standardized across a plurality of cash handling devices, thereby enabling concurrent analysis of similarly identified register tills in multiple locations. For example, a plurality of cash handling devices may each service a register till having a PHARMACY till identifier, thereby enabling concurrent analysis of all PHARMACY register tills associated with a common entity identifier; as another example a plurality of cash handling devices may each service transactions with a user having a user identifier including the term PHARMACIST (e.g., a first user identifier associated with a first location may have a user identifier "csmith_PHARMACIST" and a second user identifier associated with a second location may have a user identifier "jdoe_PHARMACIST"—although the user identifiers are unique to each user, the common inclusion of the PHARMACIST indication in each user identifier may be utilized for grouping transactions associated with these users for concurrent analysis).

In yet other embodiments, each user and/or register till may have a unique identifier associated therewith. The unique identifier for each register till and/or user may be separately associated with description data associated with the register till identifier and/or user identifier. For example, a register till identifier may be associated (e.g., within a storage area of the monitoring server) with description data indicating that the register till is the PHARMACY register till. In certain embodiments, the description data may be selected from a plurality of available options, thereby ensuring standardization between register tills. In other embodiments, the description data may be free-form data provided as user input when initializing a new register till with the cash handling device and/or the monitoring server. It should be understood that the description data may be utilized to identify similarly situated register tills (or users) associated with disparate cash handling devices, such that register tills (or users) having similar/identical description data may be analyzed concurrently when generating and/or maintaining a cash usage model.

The user identifier and/or register till identifier (and/or associated descriptions thereof) may be utilized in determining an appropriate amount and/or mix of cash to be distributed to a particular user and/or register till. As just one example, cash usage models may determine (e.g., automatically and/or based at least in part on manual user input), that certain user identifiers and/or register till identifiers are associated with users and/or register tills that should be provided with a higher amount of cash and/or a different cash denomination mix than others. As a specific example, those register tills associated with a PHARMACY identifier (and/or description) may be identified as requiring a higher amount of cash in the aggregate, and/or a higher percentage of high-denomination bills (e.g., $20 bills) than other register tills (e.g., register tills associated with a CUSTOMER-_SERVICE identifier (and/or description). In certain embodiments, determinations of the amount of cash and/or the mix of cash denominations appropriate for distribution to a particular register till may be made based at least in part on other characterizing data that may be associated with the register till (e.g., additional data associated with the description of the register till). For example, data indicative of the type and/or average cost of products typically purchased at the register till (or through a particular user), data indicative of the average volume of customer transactions processed at a particular register till (or through a particular user), data indicative of whether a particular register till, location, entity, and/or the like cashes customer checks, and/or the like, may be utilized by the cash usage model in determining the appropriate amount and/or mix of cash to be distributed to a particular register till and/or user. As a specific example, a customer service register till providing check cashing services to customers may be identified as requiring a significant number of large denomination bills (e.g., $100 bills, $50 bills, $20 bills, and/or the like) relative to other register tills. Data indicating that one or more register tills provide such check cashing services may be stored within descriptive data associated with the register till identifier, within descriptive data associated with a particular entity (e.g., if all register tills associated with the particular entity provide check cashing services), and/or the like.

With reference again to FIG. 6, upon receipt of the operational data at the monitoring server 120, the monitoring server 120 is configured to generate historical data relevant for each of a plurality of cash handling devices, as reflected at Block 602 of FIG. 6. The historical data of certain embodiments may be divided by register till (e.g., having corresponding register till identifiers), by denomination, by time period (e.g., day, week, month, hour, shift, and/or the like), and/or the like. The historical data may be updated over time, for example, as additional operational data is received from each of one or more cash handling devices. The historical data may be additive in certain embodiments (such that new data is added to previously stored data associated with a cash handling device and/or register till identifier), and/or the historical data may be replaced (e.g., an oldest data record stored within the historical data may removed upon receipt of new data to be added to the historical data).

With reference again to FIGS. 7-8, the monitoring server 120 of certain embodiments is configured to consolidate historical data over time for each of a plurality of cash handling devices and/or register tills. As discussed in greater detail herein, the generation of the historical data enables an identification of trends within cash usage by one or more cash registers, an identification of patterns in cash usage (e.g., usage patterns by day of the week, day of the month, by time of the year, and/or the like), thereby enabling optimization of the amount of cash dispensed into a register to reflect likely usage of cash at a particular register till determined based at least in part on the historical data. As shown in FIGS. 7-8, consolidated cash usage data may comprise data indicative of a total amount of cash stored within a cash handling device (or stored within a recycler of a cash handling device), a total amount of cash dispensed to one or more register tills from the cash handling device, and a total amount of cash used (e.g., the difference between the amount of cash dispensed and the amount of cash returned to the cash handling device). The historical data may be provided for each of a plurality of cash denominations, as shown in FIG. 8.

In certain embodiments, the monitoring server may be further configured to receive, generate, and/or store supplemental data indicative of one or more external factors relevant to the cash usage data. For example, the supplemental data may comprise calendar data indicative of various events (e.g., which may comprise manually entered events and/or automatically generated events identified based on one or more public information sources). For example, the supplemental data may identify holidays (which may impact the number of customers that may visit a particular store), retail sale days, tax refund days, local "pay days" (e.g., days on which a retail establishment traditionally sees an influx of customers due (at least hypothetically) to the customers in a particular geographical area receiving paychecks (e.g., every other Friday, the $15^{th}$ of every month, the $1^{st}$ of every month, and/or the like), scheduled sporting events in a particular area, scheduled festivals or other public events in a particular area, and/or the like.

As discussed in greater detail herein, the supplemental data may be utilized within one or more cash utilization models, thereby enabling accurate predictions of cash utilization based at least in part on data included within the supplemental data.

The monitoring server may be configured to receive the supplemental data from one or more sources. Certain data may be received from publicly available sources (e.g., published lists of bank holidays, published lists of public event schedules, published lists of sports schedules, and/or the like). Other supplemental data may be provided (e.g., manually) directly to the monitoring server, such as known/estimated pay days for various locations, and/or the like. In other embodiments, supplemental data may be generated and/or received at the cash handling device (e.g., users of the cash handling device may provide input indicative of known local events (e.g., regional events or store-based events)). As yet another example, data generated at cash handling device may be utilized to automatically generate supplemental data (e.g., an identified spike in cash receipts on the $1^{st}$ and $15^{th}$ of each month).

Optimization Modelling

As reflected at Block 506 of FIG. 5, the monitoring server of certain embodiments is configured to generate and/or maintain one or more cash usage models for one or more cash handling devices, one or more entities, one or more collections of cash handling devices, and/or the like. The cash utilization models of certain embodiments utilize stored historical data indicative of cash utilization from one or more time periods (e.g., an immediately preceding time period for which cash utilization data was generated) and/or supplemental data to determine optimal cash amounts and/or mixes (for each of a plurality of denominations) for distribution to one or more users and/or register tills associated with a particular cash handling device. In certain embodiments, the historical data may be preprocessed to remove outlier data prior to utilizing the historical data for generating optimization data. The cash usage models may be location specific, such that the models for cash usage are based solely on data generated at and/or with respect to a particular cash handling device. In other embodiments, the cash usage models may be generated based at least in part on cash usage data generated at a plurality of cash handling devices, thereby enabling further analysis of correlations between particular location-specific circumstances and supplemental data (if applicable and considered). Under any configuration, the cash usage models may be generated to accommodate the specific services, products, and/or the like offered through each register till. Thus, if a particular register till is known to be utilized primarily for high-volume and high-price items (e.g., a pharmacy register till), the register till may be identified as requiring a higher amount of cash than other register tills typically associated with a lower volume of transactions at a lower average sale price. In other embodiments, if a particular register till provides check-cashing services for customers, the register till may be identified as requiring a higher amount of cash than other register tills that do not provide such check-cashing services. In certain embodiments, register tills may be arranged in a hierarchical relationship, such that one or more register tills within a department may be identified as receiving higher amounts of cash than other registers within the same department (e.g., a first register within a retailer's Garden department may receive significantly more cash than a second, third, and fourth register within the same Garden department). These registers receiving higher amounts of cash may be classified within a higher tier than the other registers, and the higher amount of cash may be provided as additional confidence against unplanned advances directly from the cash handling device (instead, cash may be redirected from the higher-tier register to one or more lower tier registers if additional cash is needed during a workshift). Accordingly, the optimization data generated by the monitoring server may reflect the amount of cash to be provided to higher tier register tills within one or more departments.

The monitoring server may be configured to generate and/or maintain the one or more cash usage models using one or more user inputs, which may be provided by users accessing the monitoring server via a mobile device (or other computing entity), as reflected at Block 507. Accordingly, the monitoring server may be configured to generate and/or maintain one or more graphical user interfaces configured to provide users with data regarding the various cash usage models, and to receive user input regarding requested adjustments and/or other user-controlled factors for incorporation into the cash usage model. For example, a graphical user interface similar to FIG. 9 or FIG. 10 may be provided for receiving and/or displaying user input data indicative of one or more user-controlled factors indicative of optimization parameters. As shown, optimization factors may be provided separately for each of a plurality of cash denominations, such as via a table configured for receipt of user input for each of a plurality of cash denominations.

In certain embodiments, the user-controlled factors may comprise at least two interdependent factors, such that changing one of the interdependent factors results in a change to displayed values of another interdependent factor. The displayed values of the graphical user interface of the various user-controlled factors are reflected in generated cash usage models that influence operation of one or more cash handling devices as discussed herein. In other embodiments, the user-controlled factors may comprise one or more independent factors, or a combination of interdependent and independent factors.

In certain embodiments, the cash usage models utilize the historical data indicative of historical, actual cash usage by various cash handling devices (which may be further subdivided into actual cash usage, by denomination, of various register tills), to generate models of predicted cash usage at specific dates/times in the future. The cash usage models may generate dynamic cash usage predictions, updated as new cash usage data is provided to the monitoring server. For example, the cash usage models may generate predictions of cash usage for a future period of time (e.g., one week) and may update the predictions for each day as time progresses. Thus, predicted cash usage for April 1 may change (e.g., daily) between when an initial prediction is made on March 24 until a final prediction is made on March 31.

With reference again to FIG. 6, optimizing cash dispensing may be performed based at least in part on optimization parameter data applicable to one or more cash handling devices, register tills, and/or the like. The optimization parameter data is received as indicated at Block 603. The optimization parameter data may encompass user input data in certain embodiments. For example, the optimization parameter data may be input via a generated graphical user interface, similar to that illustrated in FIG. 9. In other embodiments, user input indicative of optimization parameters may be input via terminal code ports, and/or the like.

Figure 9:
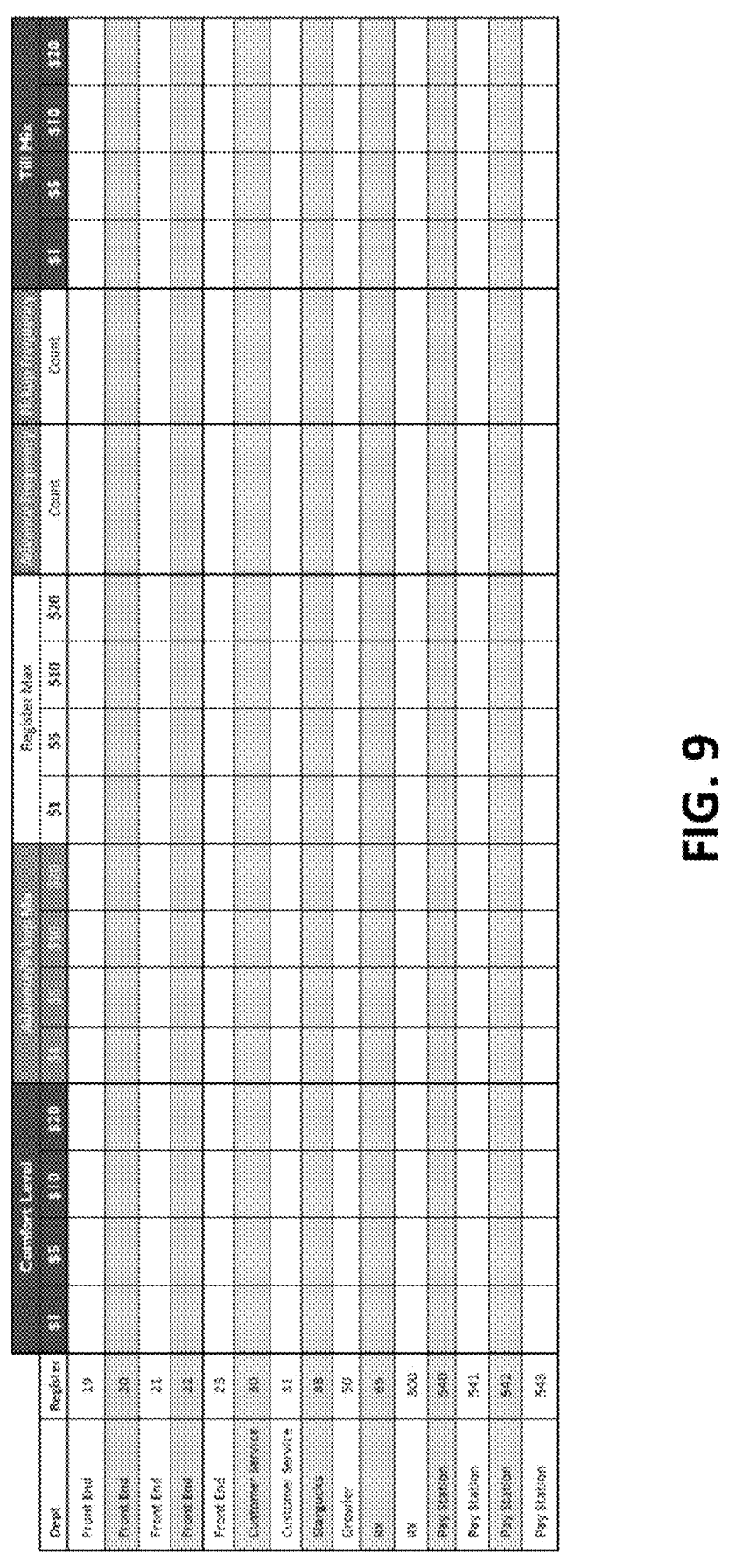

With reference to FIG. 9, the optimization parameter data may comprise data indicative of one or more optimization parameters, such as a comfort level, an advance/pickup mix, a register max, an advance frequency, a pickup frequency, a register minimum, and/or the like. In various embodiments, the comfort level may be indicative of a minimum amount of cash (e.g., provided at a denomination specific level) requested for a particular register. The comfort level may be set based at least in part on user-specific desires (e.g., provided as user input). Moreover, the comfort level may be provided for individual cash denominations, thereby providing a comfort level for each denomination within the register. A higher comfort level results in more confidence that additional advances will not be required throughout a workshift, however it may result in unnecessarily high amounts of cash on a retail floor at a given time.

In certain embodiments, a register till minimum may be provided for an overall minimum amount of cash (e.g., provided in cash value or quantity of cash bills/coins/etc.) to remain within a register at a given time. In various embodiments, the advance/pickup frequency may identify the number of scheduled advances/pickups to be made to a particular register till during a business day.

As just one example, a user associated with a first entity may provide user input indicative of optimization parameter data indicating that no cash pick-ups and/or advances should be provided to register tills during a business day. Such a user input may cause a corresponding change in the comfort level calculation, as a higher comfort level is required to ensure that register tills maintain sufficient levels of cash throughout a business day if no advances and/or pick-ups are to be performed. As another example, a user associated with a second customer may provide user input indicating that a lower comfort level is requested, corresponding with a desire to minimize the amount of cash out of a cash handling device (and on a retail floor) at any given time. Such a selection may cause a corresponding increase in the number of pick-ups and/or advances to be performed throughout a business day, such that the amount of cash within each register till remains sufficiently low to match the user's desired comfort level. In certain embodiments, the monitoring server may change the data displayed within a user interface (e.g., input data provided for at least one parameter) to reflect the interdependency with other parameters manually changed by the user. In either event, based on the user-specified factors of comfort level and/or number of pick-ups and/or advances to be performed during a business day, the monitoring server may determine an optimal amount of cash to be distributed to each register till to satisfy the user's specified parameters based at least in part on the developed cash usage model for the locations, entities, users, register tills, and/or the like. In embodiments in which a plurality of pick-ups and/or advances are scheduled to be performed throughout a business day, the monitoring server may determine the optimal amount of cash to be provided to each register till during each advance and/or pick-up scheduled during a business day.

In certain embodiments, the user-specified factors may be further dependent on supplemental data, such that one or more user-specified factors may be modified based on the applicability of portions of supplemental data. For example, a user may specify a first comfort level when no known public events are occurring at a particular location, and a second comfort level when a known, highly-publicized sale is occurring at a retail location.

As indicated at Block 604 of FIG. 6, the monitoring server 120 generates optimization data based at least in part on the historical data and/or the optimization parameter data corresponding to a particular cash handling device (and/or corresponding to one or more specific register tills). The optimization data is generated in accordance with appropriate cash usage models (e.g., generated as indicated in Blocks 506-507 of FIG. 5), so as to prepare data indicative of likely usage of cash at one or more register tills, such that the amount of cash may be optimized for those register tills. In certain embodiments, the optimization data comprises data indicative of an amount of cash to dispense to each of a plurality of register tills. The optimization data may thus be associated with register till identifiers such that the optimization data may be utilized by the cash handling device to update executing instructions such that cash is appropriately dispensed to register tills in accordance with the optimization data. Moreover, the optimization data may adjust the amount of cash to be dispensed to particular register tills during different time periods (e.g., optimization data may be generated for different days, for different work shifts, and/or the like), and accordingly the optimization data may be associated with a time/date identifier, such that the optimization data causes the executing instructions at the cash handling device to be updated such that cash is dispensed to register tills in accordance with amounts of cash specified within the optimization data on the days specified within the optimization data.

Figures 11A, 11B:
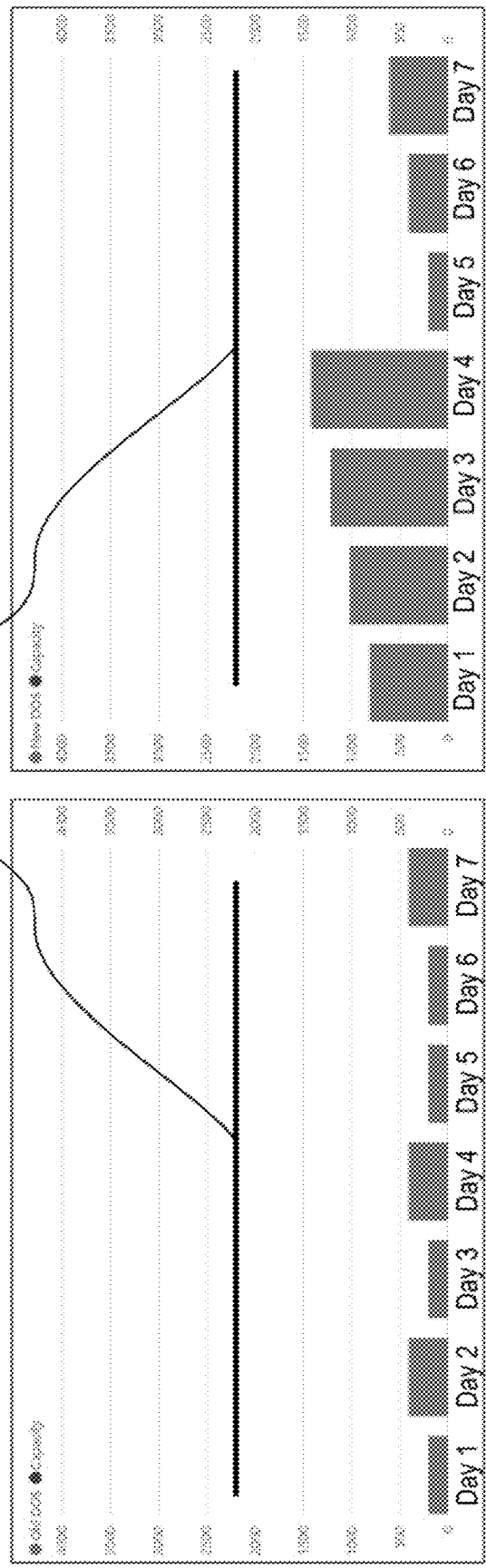
FIGS. 11A-11B illustrate example deposit cassette usage of a cash handling device according to certain embodiments.

In certain embodiments, the optimization data generated by the monitoring server 120 for a particular cash handling device may additionally comprise data identifying a quantity of physical cash (identified for each of a plurality of denominations) to be moved from a recycler cassette to a deposit cassette within the cash handling device. With reference to FIGS. 11A-11B, the optimization data may be based at least in part on predicted cash usage over a period of time, as well as the capacity of the deposit cassette of the cash handling device. Movement of cash from a recycler cassette to a deposit cassette may enable the cash handling device to maintain sufficient excess capacity to receive an increasing quantity of certain cash denominations, without requiring otherwise unnecessary change orders and/or pick-ups of cash from the cash handling device. Cash may be maintained within the deposit cassette until the quantity of cash reaches a defined threshold, while maintaining a sufficiently high amount of excess capacity in a recycler cassette to maintain typical operation of the cash handling device. Because the amount of cash necessary for distribution to register tills is predicted as a part of generation of the optimization data, the amount of cash necessary within a recycler cassette to satisfy the amount of cash distributed to register tills may be predicted for a future period of time. The optimization data may thus define a minimum amount of cash to be maintained within a recycler cassette to satisfy predicted upcoming distributions to one or more register tills. Amounts of cash exceeding the determined minimum amount of cash to maintain within a recycler cassette may be moved to a deposit cassette, and may be held within the deposit cassette until a pick-up. As shown in FIGS. 11A-11B, the amount of cash within the deposit cassette may be higher after implementation of optimization data (e.g., FIG. 11A illustrates quantities of cash within a deposit cassette without optimization, and FIG. 11B illustrates quantities of cash within a deposit cassette with optimization). As is evident by the data shown in FIGS. 11A-11B, the number of pick-ups from the deposit cassette (identified as each instance in which the quantity of cash within the deposit cassette decreases over consecutive days) may be reduced while maintaining a quantity of cash below a capacity of the deposit cassette.

As indicated at Block 605, the optimization data may be transmitted from the monitoring server 120 to the corresponding cash handling device to reconfigure executing instructions of the cash handling device in accordance with the optimization data. In various embodiments, the optimization data may comprise data identifying a cash handling device identifier and/or an electronic communication configuration/address utilized for transmitting the optimization data to the appropriate cash handling device. As indicated at Block 606, the optimization data causes the cash handling device to update the executing instructions for implementation thereof. In various embodiments, the optimization data may itself comprise an executable file format capable of causing an update of the executing instructions of the cash handling device. In other embodiments, the cash handling device controller may have one or more executing software configurations thereon that are configured to execute upon receipt of the optimization data to update the locally stored executing instructions.

Thereafter, the cash handling device dispenses cash in accordance with the updated executing instructions, as reflected at Block 607 of FIG. 6 and as discussed herein.

Controlling a Cash Handling Device

As discussed herein, the monitoring server is configured to control the operation of one or more cash handling devices in distributing cash to register tills based at least in part on the generated and/or maintained cash usage models by providing optimization data to the cash handling devices and causing the cash handling devices to update locally stored executing instructions to implement the optimized cash distribution amounts for individual register tills.

In certain embodiments, the monitoring server may be configured for generating optimization data allocating cash for a plurality of users and/or register tills (having corresponding user identifiers and register till identifiers, respectively) based at least in part on data indicating usage of a particular user identifier and/or register till identifier, for example, on a particular day. As just one non-limiting example, the monitoring server may be configured to generate an initial allocation of cash to a plurality of register tills (or user identifiers) for a particular day based at least in part on cash utilization data. However, upon determining that a particular register till will not be used during a particular day (and/or a particular user will not need a cash allocation for the particular day), for example, if an employee does not arrive at the retail location by a cutoff time (e.g., determined based at least in part on data indicating interactions with the cash handling device, data received from a third-party system (e.g., a human resource management system), and/or the like), the monitoring server may be configured to reallocate the cash based at least in part on the cash utilization data and data indicating that fewer register tills (or users) will be utilizing cash on the given day. The monitoring server may be configured to generate a flag within utilization data for the given day to indicate that fewer register tills and/or users utilized cash on the given day. As a simplified, non-limiting example, if the monitoring server generated an initial cash allocation of $1000 to be divided equally among 10 register tills on a particular day, but a cashier does not arrive at the retail location by a cutoff time (e.g., 15 minutes before store opening), the monitoring server may generate a new allocation to divide the same $1000 equally among the remaining 9 register tills. However, it should be understood that under such circumstances, the monitoring server may be configured to modify the total amount of cash allocated in addition to the amount of cash allocated to each individual register till. Following the above example, rather than dividing the same $1000 equally among the remaining 9 register tills after determining that a particular cashier does not arrive at the retail location by the cutoff time, the monitoring server may equally divide $950 among the remaining 9 register tills, for example, based at least in part on cash utilization data indicating that less cash is required when fewer register tills are operating during a business day.

The monitoring server stores the historical data in indicative of cash utilization in one or more databases for use in generating and/or maintaining cash utilization models. In certain embodiments, the cash utilization data may be segregated within the storage databases (e.g., by utilizing physically separate database storage areas; by utilizing separate encryption mechanisms; and/or the like) based at least in part on associated entity identifiers or other identifiers to impede unauthorized access to data across entities/customers/etc.

As the monitoring server determines optimal cash distribution amounts for each of a plurality of register tills based at least in part on applicable cash usage models, and/or historical data (e.g., from an immediately previous time period) the monitoring server generates optimization data for transmission to cash handling devices to modify locally stored executing instructions for distributing cash to particular register tills, as reflected at Block 508. The generated optimization data comprise data indicative of particular till identifiers (and/or user identifiers) as well as cash quantities, specified at a denominational level, for distributing cash to those tills (or users). The optimization data may be generated at the monitoring server at predefined intervals (e.g., daily) and may have a time/date identifier (or an identifier corresponding to another predefined interval) to enable application of the optimization data at an appropriate interval, such that the optimization data reflects current cash usage data at each register till. Thus, in certain embodiments, the amount and mix of cash to be distributed to a register till in accordance with optimization data may vary each day (or other time period) to maintain an optimal amount and mix of cash to be distributed to each register till based at least in part on current circumstances with the register till.

In certain embodiments, the generated optimization data are configured for transmission to cash handling device controllers, ingestion by those cash handling device controllers, and are utilized to update locally stored executing instructions for dispensing cash to one or more register tills (as reflected at Block 509 of FIG. 5). Upon receipt of new optimization data (e.g., which may be embodied as a control data file) from the monitoring server, the cash handling device controller replaces existing cash distribution execution instructions with cash distribution execution instructions reflected in the new optimization data. In other embodiments, the cash handling devices compare cash distribution execution instructions reflected within the new optimization data with existing cash distribution execution instructions stored locally at the cash handling device, and replaces any individual cash distribution execution instructions with the newly received data upon identifying any differences therebetween.

Thereafter, the cash handling device implements the optimal cash distribution amounts as determined by the monitoring server when distributing cash to individual cash tills (and/or users), based at least in part on a till identifier (and/or user identifier). When distributing cash to the particular tills and/or users, the cash handling device distributes cash in accordance with locally stored cash distribution execution instructions, as reflected at Block 510. Thus, when the locally stored cash distribution execution instructions are updated (e.g., in response to receipt of optimization data received from the monitoring server), the cash handling device implements the updated cash distribution execution instructions when distributing cash.

As discussed above, the cash usage model may be configured to generate dynamic determinations of optimal cash distribution for each of one or more register tills. Accordingly, the monitoring server may periodically transmit updated optimization data to the cash handling devices, for example, at defined intervals (e.g., hourly, daily, weekly, and/or the like). In other embodiments, the monitoring server may transmit updated optimization data to one or more cash handling devices upon the occurrence of one or more trigger events (e.g., a determination that an update to the cash distribution executing instructions is appropriate based at least in part on the cash usage model, and/or the like).

In various embodiments, the optimization data may be implemented at the cash handling device as a single-time update to executing instructions of the cash handling device. In other embodiments, the optimization data may be implemented at the cash handling device as a permanent change to the executing instructions (until later optimization data is received). For example, in the former embodiments, the cash handling devices may be configured to implement a default set of executing instructions for disseminating cash to one or more register tills in the absence of receipt of optimization data for a particular time period. In the latter embodiments, the cash handling devices may be configured to implement a set of executing instructions updated based at least in part on optimization data unless and until a new set of optimization data is received. In yet other embodiments, at least a portion of the optimization data may cause the cash handling device to execute a one-time action (e.g., moving cash from a recycler cassette to a deposit cassette) upon receipt of the optimization data, and in such embodiments the cash handling device does not perform the same type of action unless and until the cash handling device receives another set of optimization data.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for controlling operation of a cash handling device (CHD), the system comprising at least one memory and one or more processors configured to:
   receive, by a communication interface, a first cash dispensing request from the CHD, wherein the first cash dispensing request comprises a first unique identifier;
   generate first optimization data identifying a first quantity of a first denomination of cash and a second quantity of a second denomination of cash;
   transmit, by the communication interface, the first optimization data to the CHD to cause the CHD to dispense the first quantity of the first denomination of cash and the second quantity of the second denomination of cash;
   receive, by the communication interface, a second cash dispensing request from the CHD, wherein the second cash dispensing request comprises the first unique identifier and wherein the second cash dispensing request is received after the first cash dispensing request;
   generate second optimization data identifying a third quantity of the first denomination of cash and a fourth quantity of the second denomination of cash; and
   transmit, by the communication interface, the second optimization data to the CHD to replace the first optimization data at the CHD and to cause the CHD to dispense the third quantity of the first denomination of cash and the fourth quantity of the second denomination of cash;
   wherein the CHD uses the first optimization data for cash dispensing for the first unique identifier until the second optimization data replaces the first optimization data.

2. The system for controlling operation of a CHD of claim 1, wherein the first unique identifier identifies one of: a user or a register till.

3. The system for controlling operation of a CHD of claim 1, wherein the one or more processors are further configured to:
   prior to transmitting the first optimization data to the CHD, determine initial optimization data for the first unique identifier and for a second unique identifier;
   receive interaction data reflecting interactions with the CHD, wherein the interaction data indicates the second unique identifier is not used; and
   adjust the initial optimization data to the first optimization data, wherein the first optimization data, when transmitted to the CHD, causes the CHD to dispense zero of the first denomination of cash and zero of the second denomination of cash for the second unique identifier.

4. The system for controlling operation of a CHD of claim 1, wherein the one or more processors are further configured to:
   receive cash usage data for the first unique identifier;
   store the cash usage data in the at least one memory as historical data for the first unique identifier; and
   update a cash usage model based at least in part on the historical data, wherein the cash usage model generates the first optimization data and the second optimization data.

5. The system for controlling operation of a CHD of claim 4, wherein the cash usage data is received after transmitting the second optimization data; and wherein the one or more processors are further configured to:
after updating the cash usage model, receive a third cash dispensing request from the CHD, wherein the third cash dispensing request comprises the first unique identifier; and
transmit, by the communication interface, third optimization data to the CHD to replace the second optimization data at the CHD and to cause the CHD to dispense a fifth quantity of the first denomination of cash and a sixth quantity of the second denomination of cash, wherein the third optimization data is generated by the cash usage model after updating the cash usage model.

6. The system for controlling operation of a CHD of claim 4, wherein the one or more processors are further configured to:
receive one or more optimization parameters, wherein the one or more optimization parameters are based at least in part on user input data.

7. The system for controlling operation of a CHD of claim 1, wherein the first optimization data comprises:
first executable data to cause the CHD to operate a first recycler cassette to dispense the first quantity of the first denomination of cash; and
second executable data to cause the CHD to operate a second recycler cassette to dispense the second quantity of the second denomination of cash.

8. A computer-implemented method for controlling operation of a cash handling device (CHD), the method comprising:
receiving a first cash dispensing request from the CHD, wherein the first cash dispensing request comprises a first unique identifier;
generating first optimization data identifying a first quantity of a first denomination of cash and a second quantity of a second denomination of cash;
transmitting the first optimization data to the CHD to cause the CHD to dispense the first quantity of the first denomination of cash and the second quantity of the second denomination of cash;
receiving a second cash dispensing request from the CHD, wherein the second cash dispensing request comprises the first unique identifier and wherein the second cash dispensing request is received after the first cash dispensing request;
generating second optimization data identifying a third quantity of the first denomination of cash and a fourth quantity of the second denomination of cash; and
transmitting second optimization data to the CHD to replace the first optimization data at the CHD and to cause the CHD to dispense a third quantity of the first denomination of cash and a fourth quantity of the second denomination of cash;
wherein the CHD uses the first optimization data for cash dispensing for the first unique identifier until the second optimization data replaces the first optimization data.

9. The computer-implemented method for controlling operation of a CHD of claim 8, wherein the first unique identifier identifies one of: a user or a register till.

10. The computer-implemented method for controlling operation of a CHD of claim 8, further comprising:
prior to transmitting the first optimization data to the CHD, determining initial optimization data for the first unique identifier and for a second unique identifier;
receiving interaction data reflecting interactions with the CHD, wherein the interaction data indicates the second unique identifier is not used; and
adjusting the initial optimization data to the first optimization data, wherein the first optimization data, when transmitted to the CHD, causes the CHD to dispense zero of the first denomination of cash and zero of the second denomination of cash for the second unique identifier.

11. The computer-implemented method for controlling operation of a CHD of claim 8, further comprising:
receiving cash usage data for the first unique identifier;
storing the cash usage data in memory as historical data for the first unique identifier; and
updating a cash usage model based at least in part on the historical data, wherein the cash usage model generates the first optimization data and the second optimization data.

12. The computer-implemented method for controlling operation of a CHD of claim 11, wherein the cash usage data is received after transmitting the second optimization data; and
wherein the method further comprises:
after updating the cash usage model, receiving a third cash dispensing request from the CHD, wherein the third cash dispensing request comprises the first unique identifier; and
transmitting third optimization data to the CHD to replace the second optimization data at the CHD and to cause the CHD to dispense a fifth quantity of the first denomination of cash and a sixth quantity of the second denomination of cash, wherein the third optimization data is generated by the cash usage model after updating the cash usage model.

13. The computer-implemented method for controlling operation of a CHD of claim 11, further comprising:
receiving one or more optimization parameters, wherein the one or more optimization parameters are based at least in part on user input data.

14. The computer-implemented method for controlling operation of a CHD of claim 8, wherein the first optimization data comprises:
first executable data to cause the CHD to operate a first recycler cassette to dispense the first quantity of the first denomination of cash; and
second executable data to cause the CHD to operate a second recycler cassette to dispense the second quantity of the second denomination of cash.

15. A computer program product comprising a non-transitory computer readable medium having computer program instructions stored therein, the computer program instructions when executed by a processor, cause the processor to:
receive a first cash dispensing request from a cash handling device (CHD), wherein the first cash dispensing request comprises a first unique identifier;
generate first optimization data identifying a first quantity of a first denomination of cash and a second quantity of a second denomination of cash;
transmit the first optimization data to the CHD to cause the CHD to dispense the first quantity of a first denomination of cash and the second quantity of a second denomination of cash;
receive a second cash dispensing request from the CHD, wherein the second cash dispensing request comprises the first unique identifier and wherein the second cash dispensing request is received after the first cash dispensing request;

generate second optimization data identifying a third quantity of the first denomination of cash and a fourth quantity of the second denomination of cash; and transmit second optimization data to the CHD to replace the first optimization data at the CHD and to cause the CHD to dispense a third quantity of the first denomination of cash and a fourth quantity of the second denomination of cash;

wherein the CHD uses the first optimization data for cash dispensing for the first unique identifier until the second optimization data replaces the first optimization data.

16. The computer program product of claim 15, wherein the computer program instructions, when executed by a processor, further cause the processor to:

prior to transmitting the first optimization data to the CHD, determine initial optimization data for the first unique identifier and for a second unique identifier;

receive interaction data reflecting interactions with the CHD, wherein the interaction data indicates the second unique identifier is not used; and adjust the initial optimization data to the first optimization data, wherein the first optimization data, when transmitted to the CHD, causes the CHD to dispense zero of the first denomination of cash and zero of the second denomination of cash for the second unique identifier.

17. The computer program product of claim 15, wherein the computer program instructions, when executed by a processor, further cause the processor to:

receive cash usage data for the first unique identifier;

store the cash usage data in a memory as historical data for the first unique identifier; and update a cash usage model based at least in part on the historical data, wherein the cash usage model generates the first optimization data and the second optimization data.

18. The computer program product of claim 17, wherein the cash usage data is received after transmitting the second optimization data; and wherein the computer program instructions, when executed by a processor, further cause the processor to:

after updating the cash usage model, receive a third cash dispensing request from the CHD, wherein the third cash dispensing request comprises the first unique identifier; and transmit, by a communication interface, third optimization data to the CHD to replace the second optimization data at the CHD and to cause the CHD to dispense a fifth quantity of the first denomination of cash and a sixth quantity of the second denomination of cash, wherein the third optimization data is generated by the cash usage model after updating the cash usage model.

19. The computer program product of claim 17, wherein the computer program instructions, when executed by a processor, further cause the processor to:

receive one or more optimization parameters, wherein the one or more optimization parameters are based at least in part on user input data.

20. The computer program product of claim 15, wherein the first optimization data comprises:

first executable data to cause the CHD to operate a first recycler cassette to dispense the first quantity of the first denomination of cash; and second executable data to cause the CHD to operate a second recycler cassette to dispense the second quantity of the second denomination of cash.

* * * * *